US012711214B2

(12) United States Patent
Chakraborty et al.

(10) Patent No.: US 12,711,214 B2
(45) Date of Patent: Aug. 18, 2026

(54) SYSTEMS AND METHODS FOR BIOMETRIC AUTHENTICATION

(71) Applicant: ZEBRA TECHNOLOGIES CORPORATION, Lincolnshire, IL (US)

(72) Inventors: Joydeep Chakraborty, Bangalore (IN); Niraj Kumar Sharma, Dhandbad (IN); Sabir Valappil Thattath, Bangalore (IN); Nabiraj Seethalaprasad, Bangalore (IN); Amit S. Mehta, Bangalore (IN); Sundaresan Sundaram, Bangalore (IN); Avinash G Nijampure, Bangalore (IN); Adam Joel Arruda, Erin (CA)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 18/643,000

(22) Filed: Apr. 23, 2024

(65) Prior Publication Data

US 2024/0362309 A1 Oct. 31, 2024

Related U.S. Application Data

(60) Provisional application No. 63/461,800, filed on Apr. 25, 2023.

(51) Int. Cl.
*G06F 21/32* (2013.01)

(52) U.S. Cl.
CPC .................................... *G06F 21/32* (2013.01)

(58) Field of Classification Search
CPC ........................... G06F 21/00; G06F 21/30–32
See application file for complete search history.

(56) References Cited

U.S. PATENT DOCUMENTS 9,626,525 B2 * 4/2017 Momchilov ........ H04L 63/0815
10,062,232 B2 * 8/2018 Allibhoy ............ G07C 9/00309
11,816,932 B1 * 11/2023 Tang ....................... G06F 18/23
(Continued)

FOREIGN PATENT DOCUMENTS

WO 2014187848 A1 11/2014

OTHER PUBLICATIONS

International Search Report and Written Opinion for International Application No. PCT/US2024/025867 mailed on Jul. 10, 2024.

*Primary Examiner* — Patrice L Winder

(57) ABSTRACT

An authentication screen that prevents access to at least one application via the computing device can be rendered on a display of a computing device. The computing device can scan a physical medium that is external to, and independent of, the computing device to acquire challenge data for a user from the physical medium and the computing device can acquire response data from the user. In response to a successful match between the challenge data and the response data, the authentication screen can be removed from the display and access to the at least one application can be granted. Once access to the computing device is granted to the user, the computing device can identify the user and manage the challenge data, response data, SSO sessions, and/or personalized device configurations.

18 Claims, 9 Drawing Sheets

(56) References Cited

U.S. PATENT DOCUMENTS

| | | | | |
|---|---|---|---|---|
| 2009/0217367 | A1* | 8/2009 | Norman | H04L 63/0815 726/8 |
| 2009/0249439 | A1 | 10/2009 | Olden et al. | |
| 2010/0133342 | A1 | 6/2010 | Singh et al. | |
| 2012/0204245 | A1 | 8/2012 | Ting et al. | |
| 2012/0313754 | A1 | 12/2012 | Bona | |
| 2016/0191499 | A1* | 6/2016 | Momchilov | H04L 63/0815 713/171 |
| 2017/0140151 | A1 | 5/2017 | Nelson et al. | |
| 2017/0270516 | A1* | 9/2017 | Jeong | H04L 63/0861 |
| 2017/0272427 | A1 | 9/2017 | Robison et al. | |
| 2022/0083636 | A1* | 3/2022 | Sarkis | H04L 63/0861 |

* cited by examiner

SYSTEMS AND METHODS FOR BIOMETRIC AUTHENTICATION

RELATED APPLICATIONS

The present application claims priority to and the benefit of U.S. Provisional Application No. 63/461,800, filed on Apr. 25, 2023, which is incorporated by reference herein in its entirety.

BACKGROUND

In enterprise systems, provisioning of mobile devices can be a challenge for information technology (IT) administrators, particularly where the mobile devices are intended to be shared by multiple users, e.g., throughout a day, week, month, etc. For example, some shared mobile devices are programmed to lock users out of the devices (e.g., via a locked screen), e.g., after a period of time has elapsed since the users last interacted with the devices. In one example, after a user has been locked out of a device, the shared mobile device can render a locked screen that requires the user to input a passcode to unlock the device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
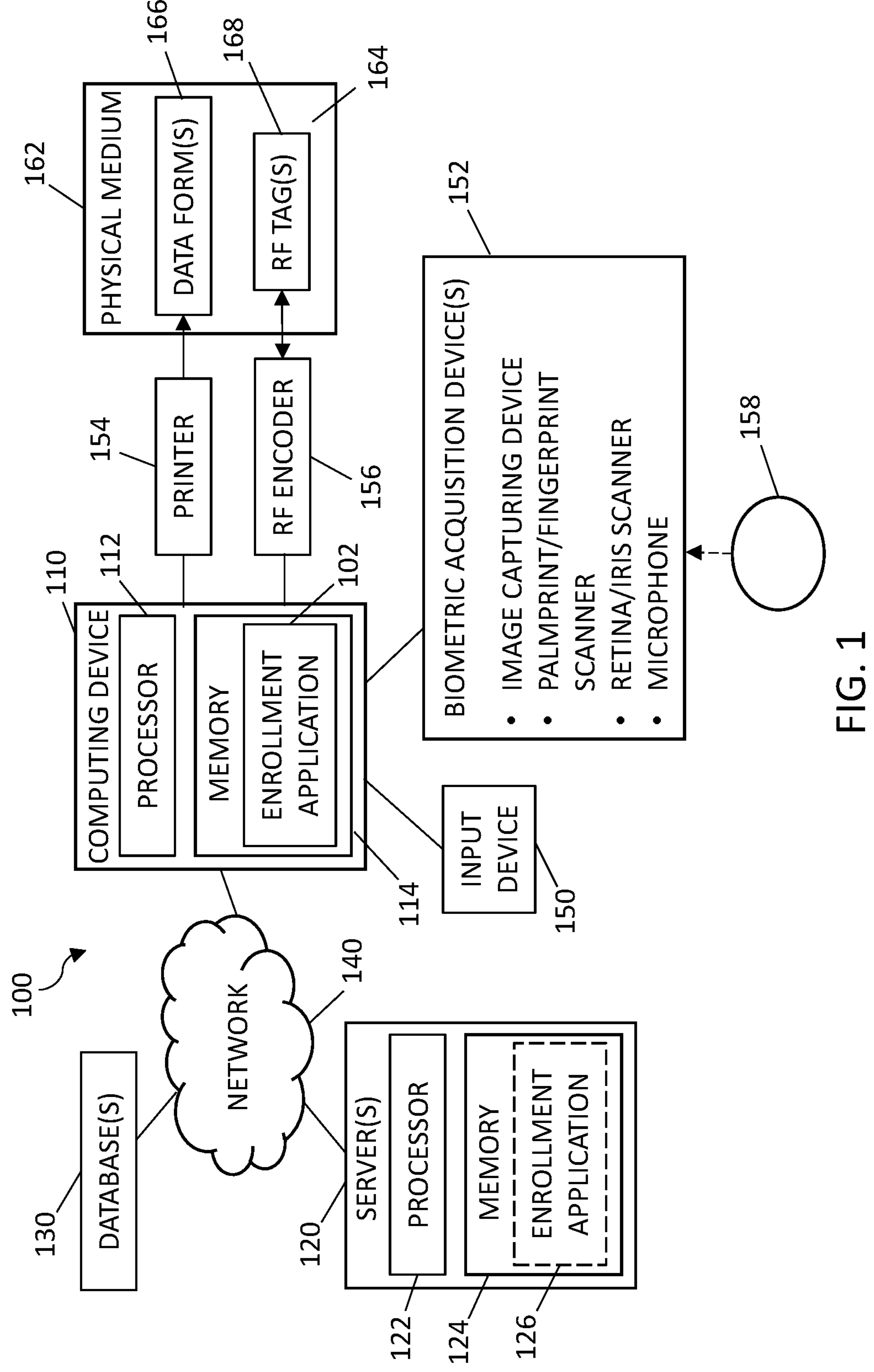
FIG. 1 illustrates an example system to facilitate user enrollment in accordance with embodiments of the present disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The components of embodiments of the present disclosure have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Locked screens on devices typically serve as a security measure that is intended to prevent unauthorized access to applications and/or data on the devices and/or to applications and/or data on other devices, e.g., servers, with which the devices are configured to communicate. As an example, if a device is lost or stolen, the locked screen can prevent others from accessing sensitive information on the device. Such locked screen functions can aid in maintaining the privacy and integrity of the data on the device or another device (e.g., a server with which the device can communicate). The locked screens of mobile devices typically require a user to input response data, such as a passcode (e.g., personal identification number (PIN), a password, sequence of gestures, etc.) and/or an image of the face of the user. The input response data can be compared to challenge data stored on the device. As an example, to unlock the device, the entered passcode can be compared to the passcode stored by device and/or the imaged face of the user can be compared to the image of the face of the user stored by the device. The challenge data (e.g., stored passcode and/or image of the user) is typically established using the device (e.g., during provisioning or configuring of the device), where a user would enter the passcode and use the device to image the face of the user to be stored on the device as the challenge data. As an example, for mobile devices that use the Android operating system, the devices can enter a lock out mode of operation after the mobile devices have been idle for a specified duration of time and/or in response to input from the user. When a user wishes to operate the device after it has been locked out, the locked screen can be presented to the user requesting the response data (e.g., input passcode or a live image of the face of the user).

When a device is intended to be shared by different users, e.g., in an enterprise system, the users typically each use the same passcode to gain access to the shared device. The provisioning of a shared device with a single passcode that is shared by users in enterprise systems often occurs because of the difficulties in managing different passcodes for each user for multiple devices in the enterprise system, where there can be hundreds or thousands of shared devices and hundreds or thousands of users. Additionally, there is typically no mechanism on these shared devices that would allow the devices to user facial features of different users of the shared devices to gain access to the device (e.g., because these devices are typically programmed for a one-to-one relationship between a specific user and the device, preventing the device from storing facial features of different users). The use of facial imaging on a shared device can pose similar problems and issues as using multiple passcodes for the shared device with respect to managing different users. Additional concerns may also arise from storing facial features of multiple users on a single device. For example, the storage of facial features on a shared device can raise privacy and/or security concerns and may require special handling of such facial feature data.

Furthermore, the locked screens of shared mobile devices typically do not provide an opportunity for the user to input a user identifier/name to inform the device as to which user is attempting to unlock the device using the passcode or the image of the face of the user. As a result, all the end users of the shared devices in the facility share the same passcode without requiring the identity of the user to be known to get past the locked screen, which can create security issues. For example, if a passcode is compromised, all devices using that passcode in a facility can be compromised. Additionally, because all users share the same passcode to unlock a shared device without requiring a user identifier/name to distinguish between users, there is no user accountability or ability to track which user has done what with a device.

To overcome the problems and challenges associated shared devices, e.g., in enterprise systems, embodiments of the present disclosure can provide enrollment processes and authentication processes that enable a temporary one-to-one mapping of each user to a shared device upon authenticating a user based on challenge data obtained from a physical medium that is external to, and separate and distinct from, the shared device. As an example, embodiments of the enrollment process can allow a user to establish challenge data that are specific to the user. The challenge data can be established independent of the shared devices to be used by the user (e.g., there is no requirement of authentication provisioning, such as passcode provisioning, of the shared devices).

The enrollment process can create, provision, and/or configure a physical medium, separate from the shared devices, that includes the challenge data, a user identifier, and/or additional data or credentials, and the physical medium can be used by the user when attempting to gain access to a shared device. As an example, embodiments of the authentication process can allow a shared device to scan the physical medium to obtain the challenge data for the user (e.g., the shared device requires no a priori knowledge of the challenge data for the user before acquiring the challenge data from the physical medium). Once the challenge data are obtained from the physical medium, the shared device can compare the challenge data from the physical medium to response data acquired from the user, e.g., through a user interface or a biometric acquisition device of the device. Using this approach, each user can have their own passcode that they do not need to share with any other user and/or use their biometric features for authentication. As each user has their own passcode and/or uses their biometric features, and also presents a physical medium having the passcode and/or the biometric data, the probability that the security of the shared device will be compromised is mitigated. Even if the physical medium is shared between users, embodiments of the present disclosure can enable tracking which user's passcode is compromised and/or deny access to certain applications for that user.

Once the user is authenticated, the user can gain access to the shared device and an identity of the user that has been authenticated can be determined and used to track or log the use of the shared device by the user. Additionally, after the user has been authenticated, the shared device can implement one or processes to facilitate single sign-on (SSO) authentication for SSO enabled applications and/or to manage the challenge data, the response data, the user identifier, and/or additional data or credentials.

As used herein, "challenge data" refers to data or credentials used by a device to authenticate a user against received "response data", which as used herein, refers to data or credentials provided by the user in response to an authentication challenge.

As used herein, "single sign-on" or "SSO" is an identification method, e.g., using identity federation, that enables users to log in to multiple applications and websites with one set of SSO credentials. Once an identity provider has verified the user's identity based on SSO credentials of the user, the identity provider can create and manage tokens/certificates that can be provided to requesting applications and/or services utilizing the SSO identification method. The tokens/certificates can be used to establish an SSO session, e.g., that exist as long as the tokens/certificates are valid. In some instances tokens/certificates can be refreshed to maintain an active SSO session.

In accordance with embodiments of the present disclosure, a method is disclosed. The method includes rendering an authentication screen on a display of a computing device. The authentication screen prevents access to at least one application via the computing device. The method also includes scanning, by the computing device, a physical medium that is external to, and independent of, the computing device to acquire challenge data for a user from the physical medium; acquiring, by the computing device, response data from the user; determining whether the response data matches the challenge data; and in response to a successful match, removing the authentication screen from the display, and granting access to the at least one application. In accordance with embodiments of the present disclosure, a non-transitory computer-readable medium comprising instructions is disclosed. Execution of the instructions by a processor causes the processor to perform the method.

In accordance with embodiments of the present disclosure, the method includes deleting the challenge data and the response data from the computing device after determining whether the response data matches the challenge data.

In accordance with embodiments of the present disclosure, the method includes rendering the authentication screen again after a lock screen event occurs; re-scanning, by the computing device, the physical medium to re-acquire challenge data for the user from the physical medium; re-acquiring, by the computing device, response data from the user; determining whether the re-acquired response data matches the re-acquired challenge data; and in response to another successful match, removing the authentication screen from the display, and granting access to the at least one application.

In accordance with embodiments of the present disclosure, the method includes deleting the response data from the computing device after determining whether the response data matches the challenge data; encrypting the challenge data; storing the encrypted challenge data in the computing device during a time period; and deleting the challenge data when the time period lapses or is reset.

In accordance with embodiments of the present disclosure, the method includes rendering the authentication screen again after a lock screen event occurs; determining whether the encrypted challenge data is stored in the computing device; bypassing an operation of scanning the physical medium in response to determining the encrypted challenge data is stored; re-acquiring, by the computing device, response data from the user; determining whether the re-acquired response data matches the challenge data; and in response to another successful match, removing the authentication screen from the display, and granting access to the at least one application.

In accordance with embodiments of the present disclosure, the challenge data corresponds to previously acquired biometric data for the user encoded on the physical medium and the response data corresponds to live biometric data of the user.

In accordance with embodiments of the present disclosure, the challenge data corresponds to a previously established passcode encoded on the physical medium and the response data corresponds to a user-entered passcode received by the computing device via a user interface.

In accordance with embodiments of the present disclosure, the challenge data correspond to previously acquired biometric data for the user and a previously established passcode encoded on the physical medium and the response data correspond to live biometric data of the user and a user-entered passcode received by the computing device via a user interface, and determining whether the response data matches the challenge data comprises: determining whether at least one of (i) the live biometric data matches the previously acquired biometric data for the user encoded on the physical medium or (ii) the user-entered passcode matches the previously established passcode encoded on the physical medium.

In accordance with embodiments of the present disclosure, the method includes disabling a locked screen function of the computing device; and executing, by the computing device, an authentication application that renders the authentication screen in place of the locked screen function, the authentication application implemented in a lock task mode.

In accordance with embodiments of the present disclosure, a user identifier is acquired from the physical medium in response to scanning the physical medium, and in response to the successful match, the method further comprises: identifying the user that has been authenticated via the authentication screen based on the user identifier; and associating operations performed by the computing device with the user identifier.

In accordance with embodiments of the present disclosure, the method includes receiving single sign-on credentials from the user in response to the successful match; and establishing a single sign-on session for the user with the single sign-on credentials.

In accordance with embodiments of the present disclosure, the computing device requires the user to provide the single sign-on credentials each time the authentication screen is rendered.

In accordance with embodiments of the present disclosure, the method includes rendering the authentication screen in response a lock screen event; maintaining the single sign-on session for the user; in response to a next user being authenticated based on challenge data and response data associated with the next user, determining whether the next user corresponds to the user that was last authenticated for the computing device or to a different user; in response to the next user corresponding to the user, allowing the next user to use the single sign-on session; and in response to the next user corresponding to the different user, terminating the single sign-on session and requesting new single sign-on credentials for the next user to establish a new single sign-on session.

In accordance with embodiments of the present disclosure, the next user is the user, a single sign-on username is acquired from the physical medium for the user in response to scanning the physical medium, and determining the next user corresponds to the user comprises comparing the single sign-on username acquired from the physical medium against a single sign-on username associated with the single sign-on session.

In accordance with embodiments of the present disclosure, the method includes rendering the authentication screen in response a lock screen event; maintaining a set of sign-on sessions for a plurality of users of the computing device, the plurality of users including the user; in response to a next user being authenticated based on challenge data and response data associated with the next user, determining an identity of the next user; determining whether the computing device is maintaining an active single sign-on session for the next user based on the identity of the next user; in response to determining the active single sign-on session exist for the next user, selecting the active single sign-on session corresponding to the identity of the next user and allowing the next user to use the active single sign-on session; and in response to determining the active single sign-on session does not exist for the next user, requesting new single sign-on credentials for the next user to establish a new single sign-on session.

In accordance with embodiments of the present disclosure, the challenge data and a single sign-on username for the next user is acquired from a physical medium associated with the next user, the response data for the next user is acquired from the user, the identity of the user is determined based on the single sign-on username, and determining whether the computing device is maintaining an active single sign-on session for the next user comprises comparing the single sign-on username acquired from the physical medium against a plurality of single sign-on usernames associated with the single sign-on sessions in the set.

In accordance with embodiments of the present disclosure, the method includes encrypting the single sign-on credentials; storing the encrypted single sign-on credentials; retrieving and decrypting the encrypting single sign-on credentials in response to a requirement to establish a new single sign-on session for the user; and using the single sign-on credentials to establish the new single sign-on session for the user.

In accordance with embodiments of the present disclosure, scanning the physical medium includes imaging at least one encoded data form disposed on a substrate of the physical medium via an image capturing device or a barcode scan engine of the computing device.

In accordance with embodiments of the present disclosure, scanning the physical medium includes interrogating at least one radiofrequency tag supported by a substrate of the physical medium.

In accordance with embodiments of the present disclosure, acquiring the response data includes acquiring live biometric data of the user via at least one of an image capturing device, a fingerprint scanner, a retina/iris scanner, or a microphone of the computing device.

In accordance with embodiments of the present disclosure, the method includes establishing the challenge data for the user during an enrollment process; encrypting the challenge data; and transferring the encrypted challenge data to the physical medium by at least one of printing one or more encoded data forms on the physical medium that include the challenge data or encoding one or more radiofrequency tags of the physical medium with the challenge data.

In accordance with embodiments of the present disclosure, the method includes configuring the computing device based on device configuration data acquired from the physical medium or from a server based on a universal resource locator acquired from the physical medium.

In accordance with embodiments of the present disclosure, a computing device is disclosed. The computing device includes a display, data acquisition devices, a non-transitory computer-readable medium configured to store instructions, and a processor. The processor is operatively coupled to the display and the plurality of acquisition devices. The processor configured execute the instructions to: render an authentication screen on the display, the authentication screen preventing access to at least one application; scan, via a first data acquisition device of the plurality of data acquisition devices, a physical medium that is external to, and independent of, the computing device to acquire challenge data for a user from the physical medium; acquire response data from the user via the first data acquisition device or a second data acquisition device of the plurality of data acquisition devices; determine whether the response data matches the challenge data; and in response to a successful match, remove the authentication screen from the display, and grant access to the at least one application.

In accordance with embodiments of the present disclosure, the processor is configured to delete the challenge data and the response data from the non-transitory computer-readable medium after determining whether the response data matches the challenge data.

In accordance with embodiments of the present disclosure, the processor is configured to render the authentication screen on the display again after a lock screen event occurs; re-scan the physical medium to re-acquire challenge data for the user from the physical medium via the first data acquisition device; re-acquire the response data from the user via the first or second data acquisition device; determine whether the re-acquired response data matches the re-acquired challenge data; and in response to another successful match, remove the authentication screen from the display, and grant access to the at least one application.

In accordance with embodiments of the present disclosure, the processor is configured to delete the response data from the non-transitory computer-readable medium after determining whether the response data matches the challenge data; encrypt the challenge data; store the encrypted challenge data in the non-transitory computer-readable medium during a time period; and delete the challenge data when the time period lapses or is reset.

In accordance with embodiments of the present disclosure, the processor is configured to render the authentication screen again after a lock screen event occurs; determine whether the encrypted challenge data is stored in the non-transitory computer-readable medium; bypass an operation of scanning the physical medium in response to determining the encrypted challenge data is stored; re-acquire the response data from the user via the first or second data acquisition device; determining whether the re-acquired response data matches the challenge data stored in the non-transitory computer-readable medium; and in response to another successful match, remove the authentication screen from the display, and grant access to the at least one application.

In accordance with embodiments of the present disclosure, the challenge data correspond to previously acquired biometric data for the user encoded on the physical medium and the response data correspond to live biometric data of the user.

In accordance with embodiments of the present disclosure, the challenge data corresponds to a previously established passcode encoded on the physical medium and the response data corresponds to a user-entered passcode received by the computing device via a user interface.

In accordance with embodiments of the present disclosure, the challenge data correspond to previously acquired biometric data for the user and a previously established passcode encoded on the physical medium and the response data correspond to live biometric data of the user and a user-entered passcode received by the computing device via a user interface, and the processor is configured to determine whether the response data matches the challenge data based one a determination of whether at least one of (i) the live biometric data matches the previously acquired biometric data for the user encoded on the physical medium or (ii) the user-entered passcode matches the previously established passcode encoded on the physical medium.

In accordance with embodiments of the present disclosure, the processor is configured to disable a locked screen function of the computing device; and execute an authentication application that renders the authentication screen in place of the locked screen function, the authentication application implemented in a lock task mode.

In accordance with embodiments of the present disclosure, a user identifier is acquired from the physical medium in response to the physical medium being scanned, and in response to the successful match, the processor is configured to: identify the user that has been authenticated via the authentication screen based on the user identifier; and associate operations performed by the computing device with the user identifier.

In accordance with embodiments of the present disclosure, the processor is configured to receive single sign-on credentials from the user in response to the successful match; and establish a single sign-on session for the user with the single sign-on credentials.

In accordance with embodiments of the present disclosure, the processor is configured to require the user to provide the single sign-on credentials each time the authentication screen is rendered.

In accordance with embodiments of the present disclosure, the processor is configured to render the authentication screen in response a lock screen event; maintain the single sign-on session for the user; in response to a next user being authenticated based on challenge data and response data associated with the next user, determine whether the next user corresponds to the user that was last authenticated for the computing device or to a different user; in response to the next user corresponding to the user, allow the next user to use the single sign-on session; and in response to the next user corresponding to the different user, terminate the single sign-on session and request new single sign-on credentials for the next user to establish a new single sign-on session.

In accordance with embodiments of the present disclosure, the next user is the user, a single sign-on username is acquired from the physical medium for the user in response to scanning the physical medium, and determining the next user corresponds to the user comprises comparing the single sign-on username acquired from the physical medium against a single sign-on username associated with the single sign-on session.

In accordance with embodiments of the present disclosure, the processor is configured to render the authentication screen in response a lock screen event; maintain a set of sign-on sessions for a plurality of users of the computing device, the plurality of users including the user; in response to a next user being authenticated based on challenge data and response data associated with the next user, determine an identity of the next user; determine whether the computing device is maintaining an active single sign-on session for the next user based on the identity of the next user; in response to determining the active single sign-on session exist for the next user, select the active single sign-on session corresponding to the identity of the next user and allow the next user to use the selected active single sign-on session; and in response to determining the active single sign-on session does not exist for the next user, request new single sign-on credentials for the next user to establish a new single sign-on session.

In accordance with embodiments of the present disclosure, the challenge data and a single sign-on username for the next user is acquired from a physical medium associated with the next user, the response data for the next user is acquired from the user, the identity of the user is determined based on the single sign-on username, and wherein the processor is configured to determine whether an active single sign-on session is being maintained for the next user by comparing the single sign-on username acquired from the physical medium against a plurality of single sign-on usernames associated with the single sign-on sessions in the set.

In accordance with embodiments of the present disclosure, the processor is configured to encrypt the single sign-on credentials; store the encrypted single sign-on credentials; retrieve and decrypting the encrypting single sign-on credentials in response to a requirement to establish a new single sign-on session for the user; and use the single sign-on credentials to establish the new single sign-on session for the user.

In accordance with embodiments of the present disclosure, the first data acquisition device is an image capturing device or a barcode scan engine and the processor is configured to scan the physical medium by imaging at least one encoded data form disposed on a substrate of the physical medium via the image capturing device or the barcode scan engine.

In accordance with embodiments of the present disclosure, the first data acquisition device is a radio frequency reader and the processor is configured to scan the physical medium by interrogating at least one radiofrequency tag supported by a substrate of the physical medium.

In accordance with embodiments of the present disclosure, the first or second data acquisition device is one of an image capturing device, a fingerprint scanner, a retina/iris scanner, or a microphone.

In accordance with embodiments of the present disclosure, the processor is configured to establish the challenge data for the user during an enrollment process; encrypt the challenge data; and transfer the encrypted challenge data to the physical medium by at least one of printing one or more encoded data forms on the physical medium that include the challenge data or encoding one or more radiofrequency tags of the physical medium with the challenge data.

In accordance with embodiments of the present disclosure, the processor is configured to configure the computing device based on device configuration data acquired from the physical medium or from a server based on a universal resource locator acquired from the physical medium.

FIG. 1 illustrates an example system 100 in accordance with embodiments of the present disclosure. As shown in FIG. 1, the system 100 can include a computing device 110, a server 120, and/or a database 130, which can be operatively coupled to each other through a network 140. The computing device 110 and the server 120 can execute instructions or code to implement processes in accordance with embodiments of the present disclosure. In one example, the devices 110 can be a mobile computing device, such as a mobile phone, a tablet, and/or handheld barcode readers, or can be a laptop, desk, or workstation. The network 140 can be implemented as the Internet, an Intranet, virtual private network (VPN), wide area network (WAN), local area network (LAN), a cellular network, a mesh or ad-hoc network, and/or other suitable network. The device 110 can communicate with the server 120 and database 130 via the network 140.

The computing device 110 can include a processor 112 and a non-transitory computer-readable medium, e.g., memory/storage 114 (e.g., random access memory (RAM), read-only memory (ROM), programmable ROM, erasable programmable ROM, electrically erasable programmable ROM, a magnetic storage drive, an optical storage drive, solid state drive, flash drive, any combination of the foregoing, etc.) storing instructions or executable code. The processor 112 includes, for example, one or more microprocessors, central processing units (CPUs), graphics processing units (GPUs), microcontrollers, controllers, field programmable gate arrays (FPGAs), applicant specific integrated circuits (ASICs), and/or any suitable type of logic circuits. The processor 112 can be programmed to execute the instructions or code stored in the memory 114 to implement at least a portion of an enrollment process. The computing device 110 can be in communication with an input device 150 (e.g., mouse, keyboard, touch sensitive display, etc.); a biometric acquisition device 152 (e.g., an image capturing device (e.g., a camera), a palmprint/fingerprint scanner, a retina/iris scanner, and/or a microphone); a printer 154; and/or an RF encoder 156. In some embodiments, the input device 150, the biometric acquisition device(s) 152, the printer 154, and/or the RF encoder 156 can be integrated into the computing device 110. In some embodiments, the printer 154 and the RF encoder 156 can be integrated. In some embodiments, the system may be devoid of the printer 154 or the RF encoder 156. In some embodiments, the input device 150, the biometric acquisition device 152, the printer 154, and/or the RF encoder 156 can be in communication with the device 110 via the network 140.

The server 120 can include a processor 122 and a non-transitory computer-readable medium, e.g., memory/storage 124 (e.g., random access memory (RAM), read-only memory (ROM), programmable ROM, erasable programmable ROM, electrically erasable programmable ROM, a magnetic storage drive, an optical storage drive, solid state drive, flash drive, any combination of the foregoing, etc.). The processor 122 includes, for example, one or more microprocessors, central processing units (CPUs), graphics processing units (GPUs), microcontrollers, controllers, field programmable gate arrays (FPGAs), applicant specific integrated circuits (ASICs), and/or any suitable type of logic circuits. The processor 122 can be programmed to execute instructions or code stored in the memory 214 to implement at least a portion of an enrollment process. The device 110 can communicate with the server 120 to request that the server 120 perform one or more operations. The server 120 can execute computer- or machine-readable instructions or code to perform operations and processes described herein. The server 120 can transmit responses to the device 110 and/or can output information or data associated with the response from the server 120 via one or more I/O devices, e.g., such as a display and/or a speaker. The server 120 can implement enterprise service software that can include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used.

The database 130 can be a data repository that stores data that can be used by the computing device 110 and/or the server. As an example, the database can store user identifiers associated with end users in an enterprise system and can associate information with the user identifiers, such as device usage data, user-specific device configuration data, user-specific permissions for usage of devices and applications, device provisioning data, employment information, scheduling information, and/or any other information.

An enrollment application 102 can be stored on the computing device 110 and/or the server 120 (e.g., in memory 114 and/or 124). The enrollment application 102 can be executed by the processor 112 of the computing device 110 and/or the processor 122 of the server to implement embodiments of an enrollment process. In some embodiments, enrollment application 102 can be stored on the computing device 110 and not the server 120 such that the computing device 110 is configured to implement the enrollment process. In some embodiments, the enrollment application 102 can be stored on the server and not the computing device 110 such that the computing device 110 is configured to implement the enrollment process. In some embodiments, the enrollment application 102 can be distributed between the computing device 110 and the server 120 such that the computing device 110 implements at least a portion of the enrollment process and the server 120 implements at least a portion of the enrollment process.

In an example operation of the system 100, the enrollment application can be executed by the computing device 110 and/or the server 120 to implement an enrollment process (e.g., such as example enrollment processes of FIGS. 3 and 4) to create, provision, and/or configure a physical medium 162 for a user 158 that includes user information that can be subsequently used by a computing device (e.g., computing device 210 shown in FIG. 2) to authenticate the user, identify the user, configure the computing device upon authentication of the user, and/or establish a single sign-on (SSO) session for the user. As an example, the enrollment application 102 can be executed to provide a user interface through which the user 158 can enter information, e.g., via the input device 150, such as a user identifier, challenge data (e.g., a passcode), values for device configuration parameters, SSO credentials (e.g., an SSO username), and/or other information. The user interface provided by the enrollment application 102 can also allow the user 158 to provide challenge data in the form of biometric features acquired for the user 158 via the biometric acquisition device 152. As an example, the image capturing device can capture images of a face of the user and one or more facial features can be extracted from the image using one or more existing image processing and/or object and/or facial recognition techniques and/or algorithms that can be employed by the processor 212. As another example, the image capturing device can capture images of a palm of the user and one or more palm features can be extracted from the image using one or more existing image processing and/or object and/or palmprint recognition techniques and/or algorithms that can be employed by the processor 212.

Once the challenge data (e.g., passcode and biometric features), the user identifier, the device configuration data, and/or the SSO username for the user 158 are received by the computing device 110 and/or the server 120, the computing device 110 and/or the server 120 can encrypt the challenge data (e.g., passcode and biometric features), the user identifier, the device configuration data, and/or the SSO username. In one embodiment, the SSO username of the user may not be obtained during the enrollment process and/or may not be included in the encrypted data. In one embodiment, the device configuration data may not be obtained during the enrollment process and/or may not be included in the encrypted data. In one embodiment, the user identifier can be created by the user. In one embodiment, the user identifier is assigned to the user. In one embodiment, the user identifier and/or device configuration data can be stored in a data repository, such as the database 130.

In some embodiments, the data (e.g., including the biometric data, passcode, user identifier, SSO username, and/or device configuration data) to be transferred to the physical medium can be encrypted (e.g., digitally sign) with certificate of the enterprise. As an example, an authorized individual (e.g., an administrator) of the enterprise can provide the private key of the enterprise from a secured location to be used during the enrollment process and the computing device 110 or server 120 can encrypt the data using the private key of the enterprise's certificate to generate the encrypted data.

In some embodiments, a user can interface with a device configuration interface of the computing device 110 or another device (e.g., one of the device 210) during an embodiment of the enrollment process. The device configuration interface can be recorded while the user is specifying the user's device configuration data via user interface. The recorded device configuration interface and be uploaded to a cloud service via the network 140 can be provide a unique universal resource locator (URL) from the recorded interface and can be associated with a tenant identifier. In one non-limiting example the server 120 and/or database 130 can be configured to implement the cloud service. The unique URL and tenant identified can be transferred to the physical medium with the user identifier, the passcode, and/or the SSO username to complete the enroll process. After a user is authenticated on a computing device (e.g., one of the computing devices 210 shown in FIG. 2), the computing device upon which the user is authenticated can retrieve the recorded interface of the user entering the device configuration data using the unique URL and/or tenant identifier and can use key and touch injection to configure the device based on the device configuration data entered in the recorded interface.

The computing device 110 and/or the server 120 can transfer the encrypted data to the physical medium 162 such that the physical medium is specific to the user 158. As one example, the physical medium 162 can include a substrate 164 and the computing device 110 and/or the server 120 can control the printer 154 to print one or more encoded data forms 166 on the substrate that encode the encrypted data in the one or more data forms. As another example, the physical medium 162 can include one or more RF tags 168 on or embedded in the substrate 164 and the computing device 110 and/or the server 120 can control the RF encoder 156 to encode the encrypted data in the one or more RF tags 168. As another example, the computing device 110 and/or the server 120 can control the printer 154 to print at least a portion of the encrypted data in the one or more data forms 166 and can control the RF encoder 156 to encode at least a portion of the encrypted data in the one or more RF tags 168. In one example, the one or more data forms can be linear or one dimensional (1D) barcodes, matrix codes or two dimensional (2D) barcodes, a combination of 1D and 2D barcodes (or stacked barcode), and/or any other symbologies. In one example, the one or more RF tags 168 can be radiofrequency identifier (RFID) tags, near-field communication (NFC) tags, or a combination of RFID tags and NFC tags. In some embodiments, the data size of the encrypted data can enable encoding the encrypted data into a single data form 166 and/or a single RF tag 168. In some embodiments, the data size of the encrypted data can exceed the data size limits of a single data form and/or a single RF tag. For such embodiments, the encrypted data can be encoded into multiple data forms 166 and/or multiple RF tags 168. Once the encrypted data is encoded in the one or more data forms 166 and/or encoded in the one or more RF tag 168, the user 158 can use the physical medium 162 to facilitate authentication of the user 162 with one or more computing devices, e.g., as described herein.

While an example system configuration has been illustrated in FIG. 1, one or more of the devices or elements illustrated in FIG. 1 may be combined, divided, re-arranged, omitted, eliminated and/or implemented in any other way. Further, the example system configuration illustrated in FIG. 1 may include one or more aspects in addition to, or instead of, those illustrated in FIG. 1, and/or may include more than one of any or all of the illustrated aspects.

Figure 2:
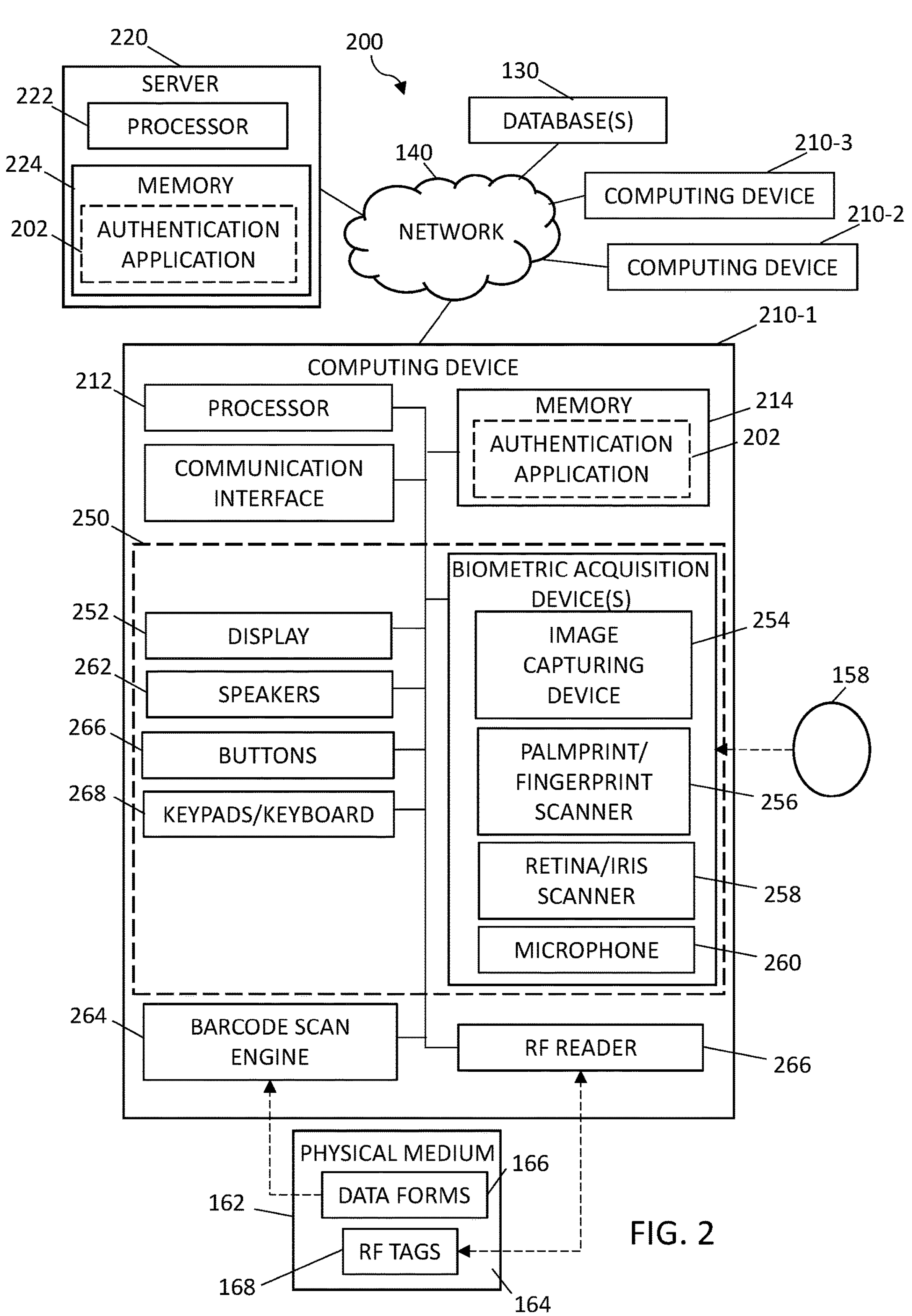
FIG. 2 illustrates an example system to facilitate user authentication in accordance with embodiments of the present disclosure.

FIG. 2 illustrates an example system 200 in accordance with embodiments of the present disclosure. As shown in FIG. 2, the system 100 can include computing devices 210 (individually computing device 210-1, 210-2, 210-3), a server 220, and/or a database 130, which can be operatively coupled to each other through the network 140. The computing devices 210 and the server 220 can execute instructions or code to implement processes in accordance with embodiments of the present disclosure. In one example, the computing devices 210 can be mobile computing devices, such as mobile phones, a tablets, handheld barcode readers, and/or other mobile computing devices; or can be a laptop; desk; or workstation. The system 200 can be implemented in an enterprise environment and the computing devices 210 can be provisioned for operation in a specified facility or specified facilities, where the computing devices 210 can be shared among several users. The network 140 can be implemented as the Internet, an Intranet, virtual private network (VPN), wide area network (WAN), local area network (LAN), a cellular network, a mesh or ad-hoc network, and/or other suitable network. The computing devices 210 can communicate with the server 220 and database 130 via the network 140.

Each of the computing devices 210 can include a processor 212 and a non-transitory computer-readable medium, e.g., memory/storage 214 (e.g., random access memory (RAM), read-only memory (ROM), programmable ROM, erasable programmable ROM, electrically erasable programmable ROM, a magnetic storage drive, an optical storage drive, solid state drive, flash drive, any combination of the foregoing, etc.), storing instructions or executable code. The processor 212 includes, for example, one or more microprocessors, central processing units (CPUs), graphics processing units (GPUs), microcontrollers, controllers, field programmable gate arrays (FPGAs), applicant specific integrated circuits (ASICs), and/or any suitable type of logic circuits. The processor 212 can be programmed to execute the instructions or code stored in the memory 214 to implement at least a portion of an authentication process. In some embodiments, the computing device 110 (FIG. 1) can be configured in the same manner as the computing device 210 such that an authentication application can be executed by the computing device 110 to implement at least a portion of the authentication process.

Each of the computing devices 210 can also include input/output (I/O) devices 250 including, for example, a display 252 (including, e.g., touch screen display); one or more biometric acquisition devices, such as an image capturing device 254 (e.g., a camera), a palmprint/fingerprint scanner 256, a retina/iris scanner 258, a microphone 260; speakers 262; a barcode scan engine 264 (e.g., a laser, linear imager, or array/2D area imager based barcode scan engine); an RF reader 266, buttons/actuators 266; and/or a keypad/keyboard 268. A user can actuate, manipulate, and/or control the display 252, the buttons 266, and/or the keypad/keyboard 268, and the processor 202 can execute one or more instructions or code in response to the input. For example, the processor 212 can control the display to render an authentication screen, can control the image capturing device 254 to image a face of the user 158, image a palm of a user, and/or image the one or more data forms 166 on the physical medium 162; the palmprint/fingerprint scanner 256 acquire a palmprint/fingerprint of the user 158, the retina/iris scanner 258 to acquire an image of the retina/iris of the user 158, the microphone 260 to acquire a voice of the user 158, the speakers 262 to output audible information to the user, the barcode scan engine 264 acquire the indicia 166, and/or the RF reader 266 to interrogate the one or more RF tag(s) 168 of the physical medium. In some embodiments, the image capturing device 254 can be configured to image the one or more data forms 166 and the computing devices 210 can be devoid of the barcode scan engine 264. In such embodiments, the processor 212 can be configured to decode the one or more encoded data forms 166. In some embodiments, the computing devices 210 can be devoid of the palmprint/fingerprint scanner 256 and/or the retina/iris scanner 258. While the image capturing device 254 and microphone 260 have been identified as biometric acquisition devices, the image capturing device 254 and microphone 260 can additionally or alternatively be used to acquire information and/or data unrelated to biometric data.

Each of the computing devices 210 can also include any number and/or type(s) wired and/or wireless communication interface 270 that facilitates communication with the other devices via the network 140. The communication interface 270 can operate in accordance with any suitable interface(s), protocol(s), signal(s), connector(s), etc. like, for example, a TCP/IP interface, a Wi-Fi™ interface (according to the IEEE 802.11 family of standards), cellular interface (e.g., using GSM, GPRS, CDMA, GPRS, 2G/GSM, 3G, 4G/LTE, EDGE, 5G), a Ethernet transceiver, a universal serial bus (USB) interface, a Bluetooth® interface, a near field communication (NFC) interface, an infrared transceiver, a satellite network radio, a cable modem, a digital subscriber line (DSL) modem, a dialup modem, or any other suitable communication protocols or standards. In the present example, the communication interface 270 can include a radiofrequency communication interface configured to wireless communication with the network (e.g., via the access points and/or base stations).

The server 220 can include a processor 222 and a non-transitory computer-readable medium, e.g., memory/storage 224 (e.g., random access memory (RAM), read-only memory (ROM), programmable ROM, erasable programmable ROM, electrically erasable programmable ROM, a magnetic storage drive, an optical storage drive, solid state drive, flash drive, any combination of the foregoing, etc.), storing instructions or executable code. The processor 222 includes, for example, one or more microprocessors, central processing units (CPUs), graphics processing units (GPUs), microcontrollers, controllers, field programmable gate arrays (FPGAs), applicant specific integrated circuits (ASICs), and/or any suitable type of logic circuits. The processor 222 can be programmed to execute instructions or code stored in the memory 224 to implement at least a portion of an authentication process. The computing devices 210 can communicate with the server 220 to request that the server 220 perform one or more operations. The server 220 can execute instructions or executable code to perform operations and processes described herein. The server 220 can transmit responses to the computing devices 210 and the device 210 can output information or data associated with the response from the server 220 via one or more of the I/O devices 250, e.g., such as the display 252 and/or the speakers 262. The server 220 can implement enterprise service software that can include, for example, RESTful (representational state transfer) API services, message queuing service, and event services that may be provided by various platforms or specifications, such as the J2EE specification implemented by any one of the Oracle WebLogic Server platform, the JBoss platform, or the IBM WebSphere platform, etc. Other technologies or platforms, such as Ruby on Rails, Microsoft .NET, or similar may also be used. In some embodiments, the server 120 (shown in FIG. 1) can be configured to implement the operations and processes of the server 220 such that the server 120 can be configured for enrollment processes and/or authentication processes.

An authentication application 202 can be stored on the computing devices 210 and/or the server 220 (e.g., in memory 214 and/or 224). The authentication application 202 can be executed by the processor 212 of the computing devices 210 and/or the processor 222 of the server 220 to implement embodiments of an authentication process. In some embodiments, authentication application 202 can be stored on the computing devices 210, and not the server 220, such that the computing devices 210 are configured to implement the authentication process. In some embodiments, the authentication application 202 can be stored on the server 220, and not the computing devices 210, such that the server 220 is configured to implement the authentication process. In some embodiments, the authentication application 202 can be distributed between the computing devices 210 and the server 220 such that each of the computing devices 210 can implement at least a portion of the authentication process and the server 220 can implement at least a portion of the authentication process.

In one example, which may be used in combination with any other examples or combination of examples described herein, the data (e.g., including the biometric data, passcode, user identifier, SSO username, and/or device configuration data) for a user (e.g., user 158) to be transferred to a physical medium (e.g., physical medium 162) can be encrypted (e.g., digitally signed) with certificate of the enterprise as part of an embodiment of an enrollment process. As an example, an authorized individual (e.g., an administrator) of the enterprise can provide the private key of the enterprise from a secured location to be used during the enrollment process and the computing device 110 or server 120 (shown in FIG. 1) can encrypt the data using the private key of the enterprise's certificate to generate the encrypted data. The computing devices 210 can be provisioned to include the public key of the enterprise's certificate. When the physical medium 162 is scanned by one of the computing devices 210 (e.g., computing device 210-1), the computing device 210-1 that scanned the physical medium 162 receives the encrypted data and attempts to decrypt the encrypted data using the public key of the certificate provisioned in the computing device 210-1. If the certificate can decrypt the encrypted data and provide valid decrypted data, then the computing device 210-1 can determine that the encrypted data was created and signed by same enterprise. If the decryption process using the public key of the certificate fails, the computing device 210-1 can determine that the encrypted data does not belong to the enterprise.

In one example, which may be used in combination with any other examples or combination of examples described herein, a lock screen function of the computing devices 210 can be disabled so that the lock screen function of the computing devices 210 is bypassed. As an example, for computing devices using the Android mobile operating system, the Android Keyguard lock screen can be set to none. In its place, an authentication screen can be rendered as a blocking screen in response to executing of the authentication application 202. Alternatively, the authentication application can be integrated into the operating system of the computing device so that the locked screen function can be configured to implement the authentication screen and facilitate the authentication process of the authentication application. The authentication screen can prevent users from passing the authentication screen without being authenticated by the computing device 210. For example, for computing devices using the Android mobile operating system, the authentication application can run in lock task mode with the authentication screen as an overlay window which will be on top of a homepage and/or any other applications. The authentication screen can also block the users from deviating from the authentication screen until the user is authenticated. For example, a home key, a recent key, a back key, and notification bar pulldown for a computing device using the Android operating system are blocked so that a user cannot deviate away from the authentication screen any other way. The lock task mode can lock the computing device into a single application (e.g., the authentication application 202), preventing users from accessing other applications, features, and/or data on or via the computing device until the user is authenticated. Once the user is authenticated, the authentication screen is passed and the user will get access to the computing device (e.g., to the Android device launcher for Android-based computing devices). In this way users can share the same device as their response data (e.g., live biometric data and/or passcode) are compared against the challenge data saved in an external source, e.g., a physical medium, such as the physical medium 162.

In one example, which may be used in combination with any other examples or combination of examples described herein, an embodiment of the enrollment application 102 (shown in FIG. 1) can be executed to implement an enrollment process that can create a one-to-one mapping between a user (e.g., user 158) and a passcode. A user identifier and passcode can be encoded, encrypted, and transferred to a physical medium (e.g., the physical medium 162). One of the computing devices 210 (e.g., computing device 210-1), executing an embodiment of the authentication application can implement an authentication process that can scan the physical medium 162 and request that the user 158 enters a passcode. If the entered passcode matches, user 158 is authenticated and granted access to the computing device 210-1. Because each user has their own passcode, there is no need to share their passcode with any other users and no separate passcode provisioning is required for each computing device 210. The usage of the computing device 210-1 by the user 158 can be tracked based on the identity of the user 158 that has logged in to the computing device 210-1, as each user can be identified by the unique identifier retrieved from the physical medium 162. As each user has their own passcode and is required to scan their own physical medium with the computing devices 210, the probability of compromising the security of the computing devices 210 and the enterprise system 200 in general is mitigated. Even if the passcode is compromised, the passcode used to authenticate the user can be tracked to determine which user's passcode has been compromised and can deny entry for that user.

In one example, which may be used in combination with any other examples or combination of examples described herein, an embodiment of the enrollment application 102 (shown in FIG. 1) can be executed to implement an enrollment process that can create a one-to-one mapping between a user identifier and biometric data for the user. The user identifier and biometric data can be encoded, encrypted, and transferred to a physical medium (e.g., the physical medium 162). As an example, the user identifier and the biometric data can be encrypted using a certificate for the enterprise (e.g., the user's employer) so that after decrypting the encrypted data a determination can be made as to whether the user is from (or employed by) the enterprise. In accordance with embodiments of the present disclosure, one of the computing devices 210 (e.g., computing device 210-1), executes an embodiment of the authentication application 202 to implement an authentication process that scans the physical medium 162 and acquires live biometric data of the user 158, for example, by starting camera preview of an image capturing device (e.g., image capturing device 254) to capture facial biometrics. The facial biometrics in live camera preview should match the biometric vectors from the physical medium 162. If there is a match, the user 158 is granted access to the computing device 210-1. No separate biometric data provisioning is required for the computing device 210-1 as biometric data is encoded on the physical medium 162. While an example of the biometric data are facial features, the biometric data can include other biometric data described herein or a combination of the biometric data described and can utilize other biometric data acquisition devices or a combination of biometric acquisition devices. The user identifier can be obtained from the physical medium 162 when it is scanned to authenticate the user and the user identifier can track which user has logged in to the computing device 210-1. The configuration of the computing device 210-1 can be determined on the profile associated with the user identifier and the computing device 210-1 can be configured accordingly. Based on the user identifier, the computing device 210-1 or another device (e.g., server 220) can authorize the user 158 to access certain applications based on an access level associated with their user identifier. In accordance with embodiments of the present disclosure, an enrollment process can create a one-to-one mapping between a user and biometric data for the user and a passcode and biometric data, the passcode, or both the biometric data and the passcode can be required for authentication by the computing device 210.

In one example, which may be used in combination with any other examples or combination of examples described herein, the authentication application 202 can be executed by the computing device 210-1 and/or the server 220 to implement an authentication process (e.g., such example authentication processes of FIGS. 5-9) to authentication a user of the computing device 210-1. While the authentication process is described with reference to the computing device 210-1, the computing devices 210-2 and 210-3 can operate in a similar or identical manner as the computing device 210-1 when a user attempts to be authenticated for the computing devices 210-2 and 210-3. The authentication application 202 can be executed to render an authentication screen on the display 252 of the computing device 210-1 that locks the user out of the computing device 210-1 and prevents the user 158 from accessing at least one application on the computing device 210-1 or another device (e.g., the server 220) and/or prevents users from accessing data stored on the computing device 210-1 and/or stored on another device (e.g., the server 220 and/or the database 130). In the lock out state, the computing device 210-1 can allow the users to access certain applications, functions, parameters, and data stored on the computing device 210-1. For example, in some embodiments, the authentication screen can allow users to see notifications, control audio playback, acquire images, operate a flashlight function, initiate an emergency call, and/or check the time or date without the users having to first be authenticated by the computing device 210-1 to unlock the computing device 210-1. The authentication screen can be rendered on the display 252 when the computing device 210-1 experiences a lock screen event. Some examples of lock screen events can include, but are not limited to power on the device, allow the device to sit idle for a specified period of time, and/or receiving input for the user to turn the display off or place the device in a sleep mode.

In one non-limiting example, which may be used in combination with any other examples or combination of examples described herein, to be authenticated for the device (e.g., the computing device 210-1), the authentication screen can request that the user 158 scan the physical medium 162 that includes the challenge data to be used by the authentication application 202 in evaluating response data provided by the user 158. As an example, the device can acquire the challenge data from the physical medium 162 by imaging the one or more data forms 166 on the physical medium 162 by the barcode scan engine 264 or the image capturing device 254 and/or by interrogating the one or more RF tags 168 of the physical medium 162 using the RF reader 266. As an example, the processor 212 can control the image capturing system 254 to acquire images of encoded indica, e.g., in the form of barcodes, and can use the acquired images to detect and/or decode the encoded indicia present in the images. Once the challenge data is obtained by the computing device 210-1, the authentication screen can request that the user provide response data to the computing device 210-1. As an example, the authentication screen can request that the user 158 acquire live biometric data with the computing device 210-1, e.g., using one or more of the biometric acquisitions devices described herein, and extract live biometric features from the biometric data. As an example, the processor 212 can control the image capturing system 254 to acquire images of a face of user. The processor 212 can processor the images of the face of the user and extract live facial features from the images. One or more existing image processing and/or object and/or facial recognition techniques and/or algorithms can be employed by the processor 212 to extract facial features from the images of the face of the user. While an example of the biometric data are facial features, the biometric data can include other biometric data described herein or a combination of the biometric data described and can utilize other biometric data acquisition devices or a combination of biometric acquisition devices. The response data in the form of the live biometric feature(s) can be compared against the challenge data in the form of biometric feature(s) retrieved from the physical medium. If there is a match between the challenge and response data, the user 158 can be authenticated for the device 210-1, the authentication screen can be removed, and the user can access applications and/or data that the user was prevented from accessing when the authentication screen was rendered. If not, authentication can fail or a fallback authentication can be attempted. As an example, in the event the biometric authentication fails, the authentication screen can request additional response data requiring the user 158 to enter a passcode via the display 252 (e.g., a virtual keypad or keyboard rendered on the display 252), a physical keypad/keyboard 268, the microphone 260, or other I/O device. The response data in the form of the passcode entered by the user 258 can be compared to the challenge data in the form of the passcode retrieved from the physical medium 162. If the response data in the form of the passcode entered by the user matches the passcode from the physical medium 162, the user 158 can be authenticated for the device, the authentication screen can be removed, and the user can access applications and/or data that the user was prevented from accessing when the authentication screen was rendered. In some embodiments, user may be required to satisfy a two-factor authentication screen that requires successful authentication using both biometric data and passcodes. Using this approach each user can be authenticated for the device based on user-specific data and each user can have their own authentication data/credentials for authentication on one or more computing devices in the system 200.

Once the user has been authenticated, the computing device can use the user identifier includes in the one or more data forms 166 and/or the one or more RF tags 168 to identify the user and track usage of the computing device 210-1 with the user, which can be stored in a log on the computing device 210-1 and/or stored in the database 130. For embodiments in which device configuration data is included in the one or more data forms 166 and/or the one or more RF tags 168, the computing device 210-1 can automatically configure the computing device 210-1 with the device configuration data. For embodiments in which device configuration data is stored by the server 220 and/or the database 130, the computing device 210-1 can communicate with the server 220 and/or the database 130 to retrieve the device configuration data, after which the processor 212 can automatically configure the computing device 210-1 with the device configuration data. The computing device 210-1 can also manage the data retrieved from the physical medium and provided by the user, for example, by deleting such the data after authentication succeeds or fails or after a configurable time period. Further examples authentication processes are described herein with reference to FIGS. 5-9.

After users are authenticated on one of the computing devices 210, embodiments of the present disclosures can facilitate and manage single-sign-on sessions for the users. For the shared computing devices (e.g., the computing device 210) that may be used by multiple users, the users can use their single sign-on (SSO) credentials to establish an SSO session and gain access to certain applications once the users are authenticated and are given access to the devices. The association between SSO sessions and the biometric data of the users and/or each user's passcode for accessing the device is typically not possible in conventional systems. As such, enterprise systems typically cannot guarantee that the users who log in via their biometric data are using their own SSO session. As an example, in one use case, a first user is authenticated by the computing device and subsequently provides the SSO credentials (SSO username and password) to establish an SSO session for the first user. If the same user locks the computing device and subsequently tries to unlock the computing device, e.g., with the first user's biometric data or the shared passcode, the first user would typically have to reenter the first user's SSO credentials. To avoid this issue, in some embodiments of the present disclosure, the computing devices 210 can be programmed and/or configured so that the first user maintains access to the first user's SSO session without requiring the first user to re-enter the first user's SSO username and password again even after having to unlock the computing devices 210 again. Alternatively or in addition, the SSO credentials of the first user can be encrypted and stored by the computing device and can be recalled and used to establish a new SSO session for the first user if the first user is the next user to utilize the device. If a second user tries to unlock (e.g., with the second user's biometric data) the same computing device (e.g., computing device 210-1) that the first user was previously using and where the first user's SSO session is active (and/or the SSO credentials of the first user are stored), the first user's SSO session is terminated by the computing device 210-1 (and/or the SSO credentials of the first user are deleted) and the computing device 210-1 requests that the second user enter the second user's SSO credentials (e.g., SSO username and password) to establish a new SSO session that is associated with the second user.

To accomplish this SSO session management, embodiments of the enrollment application can be executed to implement an enrollment process that can encode and encrypt a user's biometric data (and/or passcode) and an SSO username and transfer the encrypted data to the physical medium (e.g., physical medium 162). The user's SSO password may not be included in the encoded and encrypted data. An embodiment of the enrollment process can create a one-to-one association between the user's biometric data and the user's SSO username. In one example, the first time the first user (e.g., user 158) tries to unlock one of the computing devices 210 (e.g., computing device 210-1) using the physical medium 162 and providing live biometrics data, there may be no active SSO session in the computing device 210-1. In response to determining no active SSO session exists, the computing device 210-1 can request that the first user 158 enter the first user's SSO credentials (e.g., SSO username and password) to establish an SSO session associated with the first user 158. As non-limiting example, a Google Custom Chrome tab can be implemented with the oauth2 library using a webview of the authentication application 202, which can detect there is no SSO active session in the computing device 210-1 and a user interface (e.g., a SSO login screen) can be rendered in the display 252 of the computing device 210-1 using the webview, where the user interface requests that the first user 158 enter the first user's SSO credentials.

In some embodiments, a SSO log in screen rendered in a webview instance can be recorded while the user is specifying the user's SSO credentials. The recorded SSO credentials and/or the user's challenge data can be held in a webview instance of an SSO session established for the user. In one non-limiting example, after a user is authenticated on a computing device (e.g., one of the computing devices 210), the computing device (e.g., one of the computing devices 210) can retrieve use the recorded SSO credentials can be implemented in a SSO log in screen to establish a new SSO session for the user. Alternatively if the computing device is maintain a SSO session for the user, e.g., in a webview, the SSO credentials (e.g., SSO username acquired from the physical medium) and/or live biometric data can used to identify the webview instance associated with the user by comparing the SSO credentials acquired from the physical medium with the SSO credentials held in the webview instance and/or by comparing the live biometric data to the biometric data held in the webview instance.

Once the first user 158 establishes the first users SSO session, the user 158 can access and use applications that utilize SSO with the established SSO session without having to provide SSO credentials again. If the first user locks the computing device 210-1 and the first user 158 is the next user to unlock the computing device 210-1 (e.g., after few minutes), the first user 158 can use the computing device 210-1 to scan the first user's physical medium 162 and acquire the first user's live biometric data again to authenticate the user 158. The computing device 210-1 can determine that the first user 158 is the same user that was previously authenticated and the first user's SSO username obtained from the physical medium 162 can be used to determine if the first user 158 has an active SSO session on the computing device 210-1 (e.g., by comparing the SSO username obtained from the physical medium 162 against the SSO username of the active SSO session), e.g., maintained in a webview. If the SSO usernames match, the computing device 210-1 can determine that the user that has unlocked the computing device 210-1 and the user whose SSO session is active in the computing device 210-1 is the same user, and in response, the computing device 210-1 can provide the first user 158 access to the current active SSO session associated with the first user 158 without requiring the first user to enter the first user's SSO username and password again. Alternatively, the computing device can use SSO credentials encrypted and stored by the computing device to initiate a new SSO session for the user. However, if the first user ceases use of the computing device 210-1 and the computing device 210-1 is locked, and a second user is authenticated by the computing device 210-1 (e.g., by scanning the physical medium and providing live biometric data associated with the second user), the computing device 210-1 can determine that the second user's SSO username obtain from the second user's physical medium does not match the SSO username associated with current active SSO session in the computing device 210-1, e.g., maintained by a webview. Based on a failure to match the SSO username obtained from the second user's physical medium with the SSO username associated with the SSO session in the computing device 210-1, e.g., maintained by a webview, the computing device 210-1 determines that a different user (e.g., the second user) has unlocked the computing device 210-1. In response to determining that a different user (e.g., the second user) has been authenticated, the computing device 210-1 terminates the current active SSO session (e.g., associated with the first user) in the computing device 210-1 and renders the SSO login screen on the display of the computing device to request that the second user enter the second user's SSO credentials to establish an active SSO session associated with the second user.

In some embodiments, instead of terminating a user's SSO session (e.g., the first user) when a different user (e.g., the second user) unlocks one of the computing devices (e.g., computing device 210-1), the computing device 210-1 can maintain the SSO sessions for the users and manage access to the SSO sessions based on which user has been authenticated (which user unlocks) the computing device 210-1. Using this approach, multiple users can share the same computing device without requiring the user to re-enter their SSO username and password each time computing device is unlocked. In one example, multiple SSO sessions can be supported in webviews, where each webview instance can correspond to an SSO session for a particular user. Each webview instance can also hold the particular user's biometric data (acquired from the physical medium) to be used for subsequently authenticating the user when the authentication screen is rendered. As an example, in some embodiments, the biometric data of a user (e.g., user 158) obtained from a physical medium (e.g., physical medium 162) and compared against live biometric data acquired by the computing device 210-1 can be used by the computing device 210-1 to identify which user has been authenticated. Once the user is identified, the computing device 210-1 can automatically give the identified user access to the SSO session associated with the identified user. For example, the SSO session associated with the authenticated user can be invoked. To accomplish this SSO session management, an embodiment of the enrollment application can implement an enrollment process that can encode and encrypt a user's biometric data (and/or passcode) and SSO username in a physical medium. The user's SSO password may not be included in the encoded and encrypted data. An embodiment of the enrollment process can create a one-to-one association between the user's biometric data (and/or passcode) and the user's SSO username. The first time the first user (e.g., user 158) tries to unlock one of the computing devices 210 (e.g., computing device 210-1) using the first user's physical medium (e.g., physical medium 162) and providing live biometrics data of the first user 158, there may be no active SSO session in the computing device 210-1 (e.g., maintained in a webview instance). In response to determining no active SSO session exists, the computing device 210-1 can request that the first user 158 enter the first user's SSO credentials (e.g., SSO username and password) to establish an SSO session associated with the first user 158 (e.g., maintained in a new webview instance). This SSO login screen can be presented only once in a lifetime for that user to log into that computing device (or until the computing device is reset to factory default settings). For subsequent logins, the user is not required to enter their SSO credentials again. Once the user is authenticated, after the first time, the user is granted access to the user's SSO session and gains access to SSO enabled applications without having to re-enter the user's SSO username and/or password. As a non-limiting example, using this approach, multiple concurrent SSO sessions can maintained via webview instances using Google custom chrome tabs. Each SSO session is associated with a user's identity obtained from their respective physical medium, and based on the user being authenticated by the computing device (e.g., computing device 210-1), the computing device 210-1 retrieves the respective SSO session for that identified user and provides the identified access to the SSO session. The SSO sessions can be maintained as active for the users by periodically refreshing their access tokens (e.g., via refreshtoken). Now if the computing device 210-1 is locked after the first user uses the computing device 210-1 and the second user is authenticated by the computing device 210-1 (unlocking the computing device) via the second user's biometrics data (or passcode), the computing device 210-1 can identify the second user as a different user than whose SSO session is active in the computing device 210-1, and the second user is presented SSO login screen the first time the second user is authenticated by the device, after which the SSO session for the second user can be maintained and the next time the either the first or the second user is authenticated by the computing device 210-1 (e.g., unlocking the device), the computing device 210-1 can determine the identity of the user as being the first user or the second user and can give the identified user access to the identified user's SSO session.

While an example system configuration has been illustrated in FIG. 2, one or more of the devices or elements illustrated in FIG. 2 may be combined, divided, re-arranged, omitted, eliminated and/or implemented in any other way. Further, the example system configuration illustrated in FIG. 2 may include one or more aspects in addition to, or instead of, those illustrated in FIG. 2, and/or may include more than one of any or all of the illustrated aspects.

Figure 3:
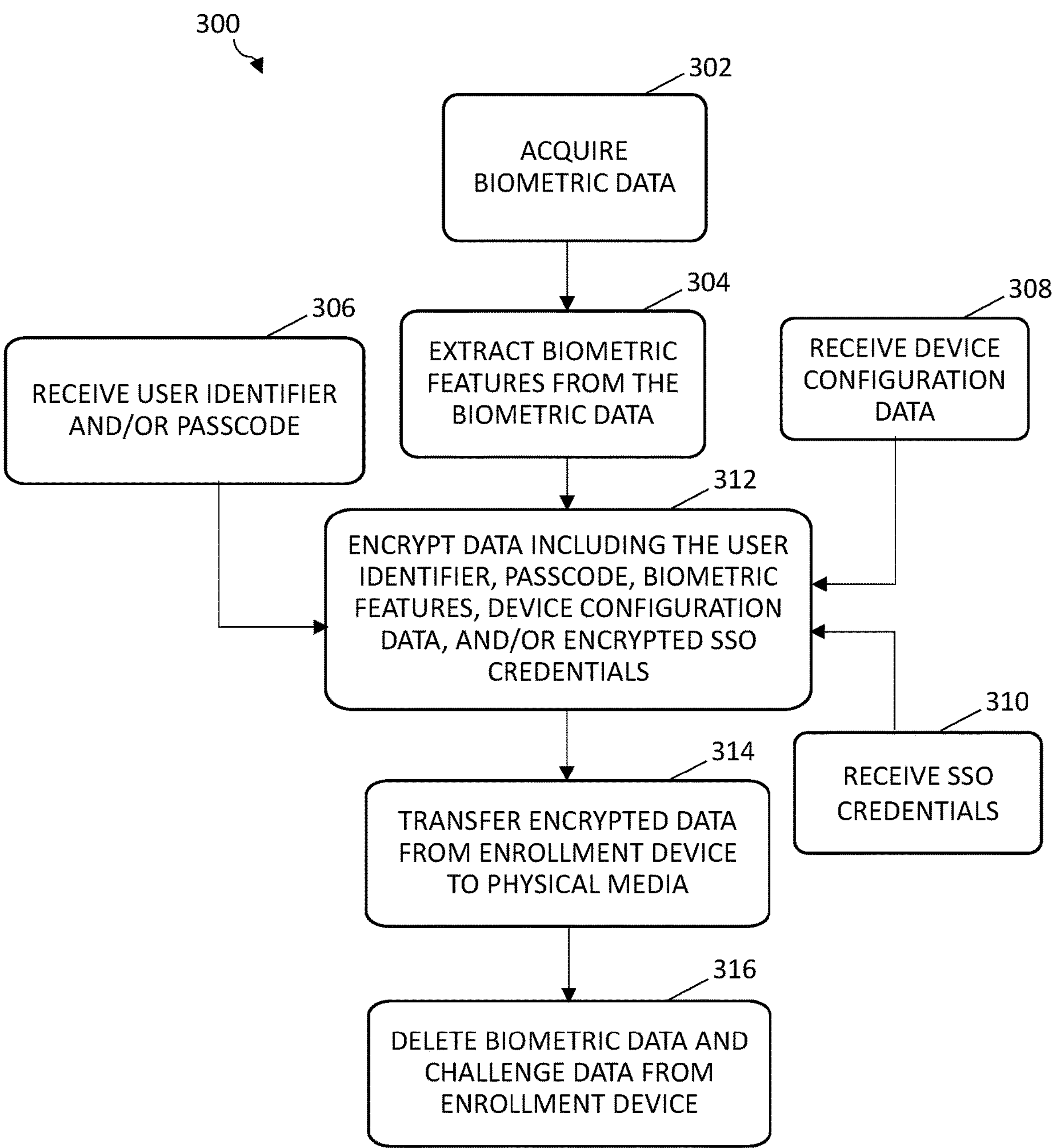
FIG. 3 is a flowchart illustrating an example enrollment process in accordance with embodiments of the present disclosure.

FIG. 3 is flowchart illustrating an example enrollment process 300 in accordance with embodiments of the present disclosure. The enrollment process 300 can be implemented to prepare physical media that includes the authentication data for use by an authentication process when an authentication screen in rendered on the display of a devices (e.g., one of the devices 110 shown in FIG. 1). The enrollment process 300 can be implemented using one or more of the devices 110, the servers 120, and/or the databases 130. In one example, the enrollment process 300, or at least a portion thereof, can be executed by the first device 110-1 of the devices 110 shown in FIG. 1. In one example, the enrollment process 300, or at least a portion thereof, can be executed by the server 120 based on data received from the first device 110-1. In one example, execution of the enrollment process 300 can be distributed between the first device 110-1 and the server 120 shown in FIG. 1.

At operation 302, a processor (e.g., of the device 110 or the server 120) can control a biometric acquisition device (e.g., biometric acquisition device 152 shown in FIG. 1) to acquire biometric data of a user. As an example, the biometric acquisition device can be an image capture device and the biometric data acquired via the biometric acquisition device can include images of a face of the user, the biometric acquisition device can be palmprint/fingerprint scanner and the biometric data acquired by the palmprint/fingerprint scanner can be a palmprint/fingerprint of the user, the biometric acquisition device can be retina/iris scanner and the biometric data acquired by the retina/iris scanner can be images of retina/iris of the user, the acquisition device can be a microphone and the biometric data acquired by the microphone can be a voice of the user, and/or the biometric acquisition device can be another device configured to acquire biometric data where the biometric data can be any biometric data that can be used to identify the user. At operation 304, the processor (e.g., of the computing device 110) or a different processor (e.g., of the server 120) can extract biometric features from the acquired biometric data. As an example, when the biometric data includes images of the face of the user, the processor or the different processor can execute facial recognition algorithms to extract facial features of the user that can be used to identify the user. As another example, when the biometric data includes a palmprint/fingerprint of the user, the processor or the different processor can execute palmprint/fingerprint recognition algorithms to extract facial features of the user that can be used to identify the user. As another example, when the biometric data includes an image of a retina/iris of the user, the processor or the different processor can execute retina/iris recognition algorithms to extract retina/iris features of the user that can be used to identify the user. As another example, when the biometric data includes a voice of the user, the processor or the different processor can execute voice recognition algorithms to extract vocal features of the user that can be used to identify the user.

At operation 306, the processor or the different processor can receive (e.g., as an input from the user) additional user information that can be used by the authentication process to authenticate the user and/or identify the user. As an example, the additional user information received by the processor or the different processor can include, for example, a user identifier associated with the user that can be used to identify the user and/or a user-specific passcode that can be used in the authentication process to authenticate the user in addition to, or instead of, the biometric data or can be used to authenticate the user in the event that authentication of the user using the biometric data fails. The biometric data or features and the passcode can be challenge data. The user identifier can be created by the user or can be assigned to the user, for example, by an administrator. In one example, the user identifier can be stored in the database 130 so that when a user is authenticated via the authentication process, the use of the device by the user can be tracked and associated with the user.

At operation 308, the processor (e.g., of the computing device 110) or the different processor (e.g., of the server 120) can receive device configuration data from the user. The device configuration data can include, for example, parameters and parameter values that can be configured on the device. As a non-limiting example, parameters and parameter values can be received for accessibility parameters, such as a display brightness, a speaker volume, an icon size, a magnification function, a touch and hold function, a talk back function, a text-to-speech function, a live caption function, and/or other parameters.

At operation 310, the processor (e.g., of the computing device 110) or the different processor (e.g., of the server 120) can receive single sign-on (SSO) username from the user. The SSO username of a user can be used with the user's SSO password to establish an authenticated SSO session with an SSO service or identity provider that permits the user to use one set of login credentials to log into and access multiple SSO enabled applications.

At operation 312, the extracted biometric features, the additional user information (e.g., the user identifier and the user-specific passcode), the device configuration data, and/or the SSO username can be encrypted by the processor or the different processor to generate encrypted data. At operation 314, the encrypted data can be transferred to a physical medium. As an example, the physical medium can be a substrate and the encrypted data can be transferred to the substrate by printing one or more encoded data forms (e.g., one-dimensional barcodes, two-dimensional barcode, or other symbology) on the substrate. As another example, the physical medium can be a substrate that includes one or more radiofrequency tags (e.g., a radiofrequency identification device (RFID) tag, a Near-Field Communication (NFC) tag) and the encrypted data can be encoded in the one or more radiofrequency tags via a radiofrequency encoder. In another example, the encrypted data can be transferred to the physical medium by printing one or more encoded data forms on the physical medium as well as encoding a radiofrequency tag with the encrypted data. Once the encrypted data is transferred to the physical medium, the physical medium can be used by one or more of the computing devices (e.g., computing device 210) when attempting to authenticate the user when the locked screen interface has locked the device. Depending on the data size of encrypted data that is transferred to the physical medium, a single data form or a single radiofrequency tag may be insufficient to contain all of the encrypted data. In such scenarios, the encrypted data can be divided amongst two or more data forms and/or two or more radiofrequency tags. At operation 316, the processor or the different processor can delete the biometric data and/or features, the additional user information (e.g., the user identifier and the user-specific passcode), the device configuration data, and/or the SSO username for memory (e.g., memory 114) to avoid storing user sensitive data.

While FIG. 3 illustrates example operations of the enrollment process 300, the enrollment process may include more or fewer operation and/or the operations may be performed in different orders or combinations. As an example, in one embodiment, the enrollment process 300 may be devoid of operation 308 and/or 310 such that the encrypted data includes the biometric data and the additional user data but does not include the device configuration data and/or the SSO username.

Figure 4:
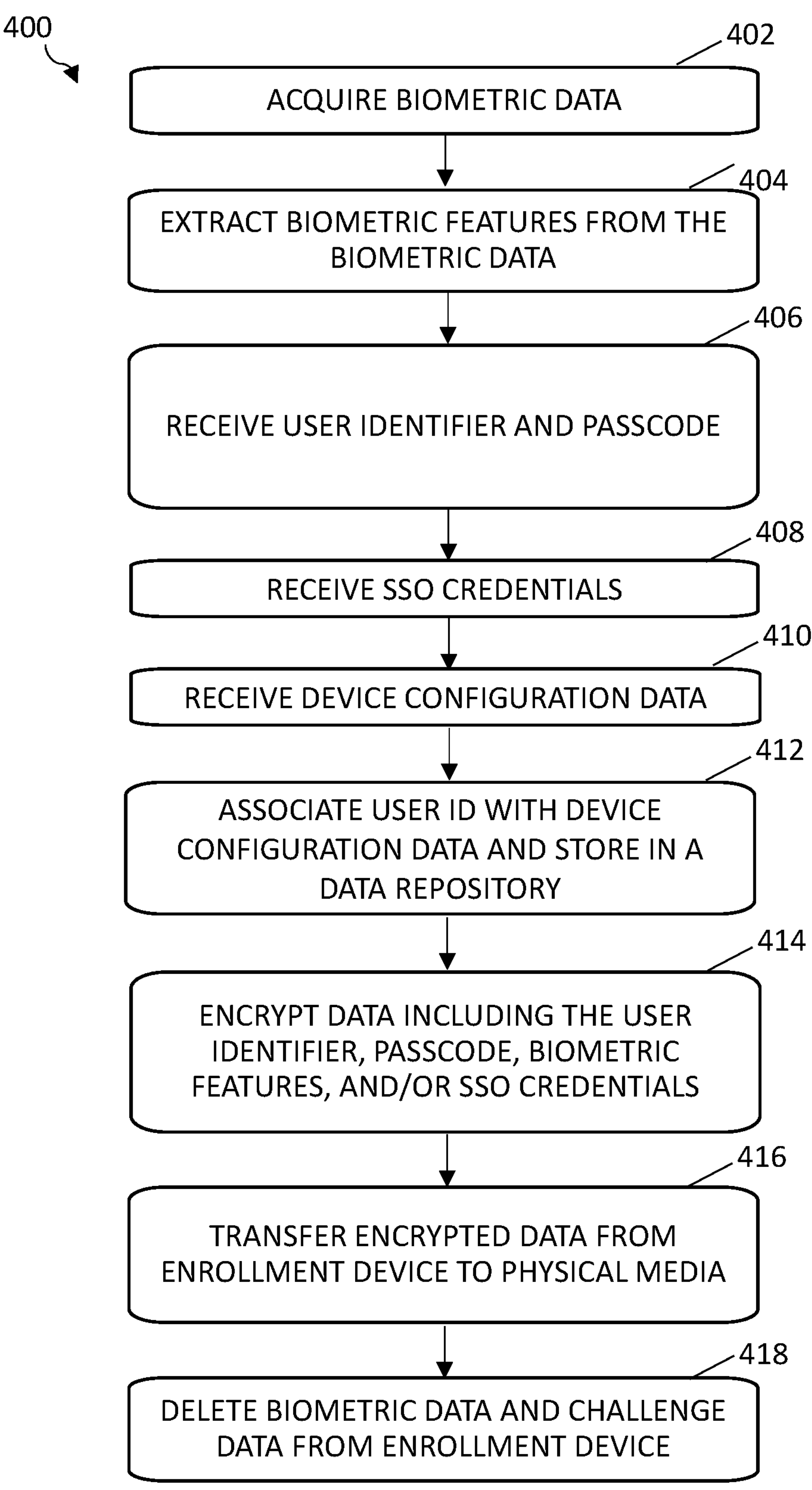
FIG. 4 is a flowchart illustrating another example enrollment process in accordance with embodiments of the present disclosure.

FIG. 4 is a flowchart illustrating another example enrollment process 400 in accordance with embodiments of the present disclosure. The enrollment process 400 can be implemented to prepare physical media that includes the authentication data for use by an authentication process when an authentication screen in rendered on the display of a computing device (e.g., the computing device 110 shown in FIG. 1). The enrollment process 400 can be implemented using the device, a server (e.g., server 120 shown in FIG. 1), and/or a database (e.g., database 130 shown in FIG. 1). In one example, the enrollment process 400, or at least a portion thereof, can be executed by the computing device. In one example, the enrollment process 400, or at least a portion thereof, can be executed by the server based on data received from the computing device. In one example, execution of the enrollment process 400 can be distributed between the computing device and the server.

At operation 402, a processor (e.g., of the device 110 or the server 120) can control a biometric acquisition device (e.g., biometric acquisition device 152 shown in FIG. 1) to acquire biometric data of a user. As an example, the biometric acquisition device can be an image capture device and the biometric data acquired via the biometric acquisition device can include images of a face of the user, the biometric acquisition device can be palmprint/fingerprint scanner and the biometric data acquired by the palmprint/fingerprint scanner can be a palmprint/fingerprint of the user, the biometric acquisition device can be retina/iris scanner and the biometric data acquired by the retina/iris scanner can be images of retina/iris of the user, the acquisition device can be a microphone and the biometric data acquired by the microphone can be a voice of the user, and/or the biometric acquisition device can be another device configured to acquire biometric data where the biometric data can be any biometric data that can be used to identify the user. At operation 404, the processor (e.g., of the device 110) or a different processor (e.g., of the server 120) can extract biometric features from the acquired biometric data. As an example, when the biometric data includes images of the face of the user, the processor or the different processor can execute facial recognition algorithms to extract facial features of the user that can be used to identify the user. As another example, when the biometric data includes a palmprint/fingerprint of the user, the processor or the different processor can execute palmprint/fingerprint recognition algorithms to extract facial features of the user that can be used to identify the user. As another example, when the biometric data includes an image of a retina/iris of the user, the processor or the different processor can execute retina/iris recognition algorithms to extract retina/iris features of the user that can be used to identify the user. As another example, when the biometric data includes a voice of the user, the processor or the different processor can execute voice recognition algorithms to extract vocal features of the user that can be used to identify the user.

At operation 406, the processor or the different processor can receive (e.g., as an input from the user) additional user information that can be used by the authentication process to authenticate the user and/or identify the user. As an example, the additional user information received by the processor or the different processor can include, for example, a user identifier associated with the user that can be used to identify the user, and/or a user-specific passcode that can be used in the authentication process to authenticate the user in addition to, or instead of, the biometric data or can be used to authenticate the user in the event that authentication of the user using the biometric data fails. The biometric data and/or feature(s) and the passcode can form challenge data. The user identifier can be created by the user or can be assigned to the user, for example, by an administrator. In one example, the user identifier can be stored in the database 130 so that when a user is authenticated via the authentication process, the use of the device by the user can be tracked and associated with the user.

At operation 408, the processor (e.g., of the computing device 110) or the different processor (e.g., of the server 120) can receive single sign-on (SSO) username from the user. The single sign-on username of a user can be used with an SSO password to establish an authenticated SSO session with an SSO service or identity provider that permits the user to use one set of login credentials to log into and access multiple SSO enabled applications.

At operation 410, the processor (e.g., of the device 110) or the different processor (e.g., of the server 120) can receive device configuration data from the user. The device configuration data can include, for example, parameters and parameter values that can be configured on the device. As a non-limiting example, parameters and parameter values can be received for accessibility parameters, such as a display brightness, a speaker volume, an icon size, a magnification function, a touch and hold function, a talk back function, a text-to-speech function, a live caption function, and/or other parameters.

At operation 412, the user identifier and the device configuration data can be stored on a data repository (e.g., such as, the database 130 shown in FIG. 1). When the user is authenticated by a device via an authentication process, the device can retrieve the device configuration data from the data repository using the user identifier retrieved from the physical medium and can configure the device according to the retrieved device configuration data.

In some embodiments, a user can interface with a device configuration interface of the computing device (e.g., device 110) or another device (e.g., one of the devices 210) during an embodiment of the enrollment process 400. The device configuration interface can be recorded while the user is specifying the user's device configuration data via user interface. The recorded device configuration interface and be uploaded and stored to a cloud service via the network 140 and a unique universal resource locator (URL) for the uploaded and stored recorded interface can be provided and can be associated with a tenant identifier. In one non-limiting example the server 120 and/or database 130 can be configured to implement the cloud service. The unique URL and tenant identifier can be transferred to the physical medium with the user identifier, the passcode, and/or the SSO username to complete the enroll process. After a user is authenticated on a computing device (e.g., one of the computing devices 210), the computing device (e.g., one of the computing devices 210) can retrieve the recorded interface of the user entering the device configuration data using the unique URL and tenant identifier and can use key and touch injection to configure the computing device (e.g., one of the computing devices 210) based on the device configuration data entered in the recorded interface.

At operation 414, the extracted biometric features, the additional user information (e.g., the user identifier, and/or the user-specific passcode), and/or the SSO username can be encrypted by the processor or the different processor to generate encrypted data. At operation 416, the encrypted data can be transferred to a physical medium (e.g., as one or more barcodes on the substrate or as data stored in one or more radiofrequency tags) as described herein. Once the encrypted data is transferred to the physical medium, the physical medium can be a shared computing device (e.g., such as computing device 210 shown in FIG. 2) when attempting to authenticate the user, e.g., when the shared computing device has been locked and the authentication screen is rendered on a display of the shared computing device. At operation 418, the processor (e.g., of the device 110) or the different processor (e.g., of the server 120) can delete the biometric features, the additional user information (e.g., the user identifier and the user-specific passcode), the device configuration data, and/or the SSO username from memory (e.g., memory 114) to avoid storing user sensitive data.

While FIG. 4 illustrates example operations of the enrollment process 400, the enrollment process may include more of fewer operation and/or the operations may be performed in different orders or combinations. As an example, in one embodiment, the enrollment process 400 may be devoid of operations 408, 410, and/or 412 such that no device configuration data is received, and the encrypted data includes the biometric data and the additional user data but does not include the SSO username.

Figure 5:
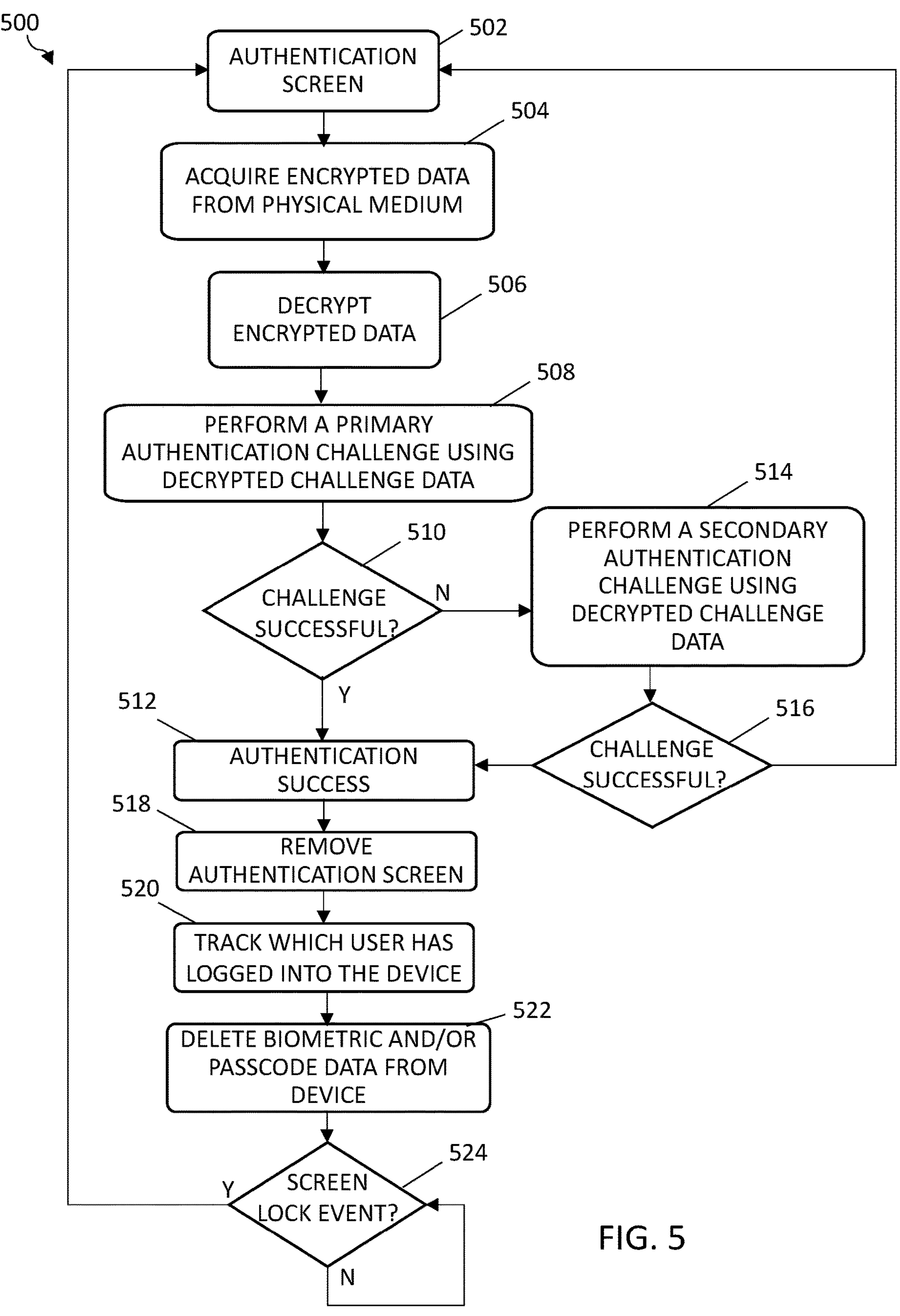
FIG. 5 is a flowchart illustrating an example authentication process in accordance with embodiments of the present disclosure.

FIG. 5 is a flowchart illustrating an example authentication process 500 in accordance with embodiments of the present disclosure. At operation 502, an authentication screen can be rendered on the display of a computing device (e.g., computing device 210-1, 210-2, or 210-3). The authentication screen can be present a locked screen to users that prevents the users from accessing at least one application on the computing device or another device (e.g., such as the server 220) with which the computing device is configured to communicate and/or can prevent users from accessing sensitive data stored on the computing device or the other device. In one example, the authentication screen can enable a user to scan a physical medium (e.g., physical medium 162) that includes encrypted data. As described herein, the encrypted data can include challenge data, such as biometric features and/or a user-specific passcode to be satisfied before a user can be authenticated and provided access to the computing device (e.g., access to certain applications and/or data), user identification data that can be used to determine an identity of the user, such as a user identifier, SSO username, device configuration data for personalized configuration of the device, and/or other information.

At operation 504, the computing device (e.g., computing device 210-1, 210-2, or 210-3) can scan/read the encrypted data from the physical medium, and at operation 506, the computing device decrypts the encrypted data. As an example, the data acquisition device can be an image capture device (e.g., image capture device 254) or a barcode scan engine (e.g., barcode scan engine 260), which can be controlled by a processor (e.g., the processor 212) of the computing device automatically and/or in response to input from the user (e.g., such as a receiving a selection of a physical or virtual button). The image capture device or barcode scan engine can image an encoded data form (e.g., one or more data forms 166) on the physical medium that encodes the encrypted data. As another example, the data acquisition device can be a radiofrequency reader (e.g., radiofrequency reader 266), which can be controlled by the processor of the computing device to interrogate a RF tag (e.g., one or more RF tags 168) of the physical medium with a radiofrequency signal automatically and/or in response to input from the user (e.g., such as a receiving a selection of a physical or virtual button). The radiofrequency tag can respond to the interrogation by outputting the encrypted data to the radiofrequency reader.

At operation 508, the computing device performs a primary authentication challenge using a first subset of the challenge data obtained from the physical medium. As an example, a message can be rendered on the authentication screen requesting the user supply response data corresponding to the first subset of challenge data. The primary authentication challenge can require a first factor for authentication. As an example, the challenge data obtained from the physical medium can include one or more biometric features and the response data received from the user can include live biometric data and/or features of the user captured by the device (e.g., via a biometric acquisition device, such as image capturing device, microphone, a palmprint/fingerprint reader, a retina scanner, or other biometric acquisition device). In one example, the live biometric data can include one or more images of a face of the user and one or more live biometric features can be facial features extracted from the image(s). The one or more live biometric feature(s) can be compared to the one or more biometric features from the physical medium to determine whether there is a match.

If the response from the user to the challenge data is successful (at operation 510), the process 500 proceeds to operation 512 at which authentication is successful. If the response from the user to the challenge data is unsuccessful, the process 500 can proceed operation 514 at which a secondary authentication challenge using a second subset of the challenge data from the physical medium can be performed. The secondary authentication challenge can require a second factor for authentication. As an example, the second subset of the challenge data can include a user-specific passcode and the secondary authentication challenge can request the user to provide a response to the secondary challenge, e.g., can request the user enter a passcode. If the response from the user to the secondary authentication challenge is unsuccessful (at operation 516), authenticate fails, the challenge data acquired from the physical medium is deleted, and the process 500 can return to operation 502 to render the authentication screen. If the response to the secondary challenge data is successful (at operation 516), the computing device successfully authenticates the user at operation 512. Using this approach, the user is authenticated against challenge data obtained from the physical medium which can be acquired by the computing device, e.g., at the time of authentication. Prior to acquiring the challenge data from the physical medium during the authentication process 500, the computing device can be unaware of the challenge data.

When the computing device successfully authenticates the user at operation 512, the computing device removes the authentication screen at operation 518 to grant the user to access the computing device (e.g., to at least one application and/or data that the user was prevented from accessing when the authentication screen was rendered on the display). At operation 520, the computing device (e.g., computing device 210-1, 210-2, or 210-3) or another device (e.g., the server 120) in communication with the computing device can track usage of the computing device and associate the usage of the computing device with the user of the computing device based on the user identifier acquired from the physical medium. The usage of the device and the association of the usage to the user can be stored in a log and/or a data repository (e.g., the database 130 shown in FIG. 1). At operation 522, the computing device can delete challenge data obtained from the physical medium and the response data received from the user. At operation 524, the computing device can determine whether a screen lock event has occurred. If not, the process 600 can repeat operation 524.

While FIG. 5 illustrates example operations of the authentication process 500, the authentication process may include more or fewer operations and/or the operations may be performed in different orders or combinations. As one example, while the process 500 has been illustrated with a primary authentication challenge and a secondary authentication challenge, embodiments of the present disclosure may include more or fewer authentication challenges (a single authentication challenge of three or more authentication challenges. For embodiments that include a single authentication challenge, the challenge can be based on biometric data or a passcode or another authentication factor. As another example, while the primary authentication challenge has been described as using biometric data and the secondary authentication challenge has been described as using a passcode, embodiments of the present disclosure can use the passcode for the primary authentication challenge or another authentication factor and can use the biometric data for the secondary authentication challenge or another authentication factor. As another example, while the secondary authentication challenge is initiated if the primary authentication challenge fails, embodiments of the present disclosure can require that both the primary and secondary authentication challenges are successful before authenticating the user.

Figure 6:
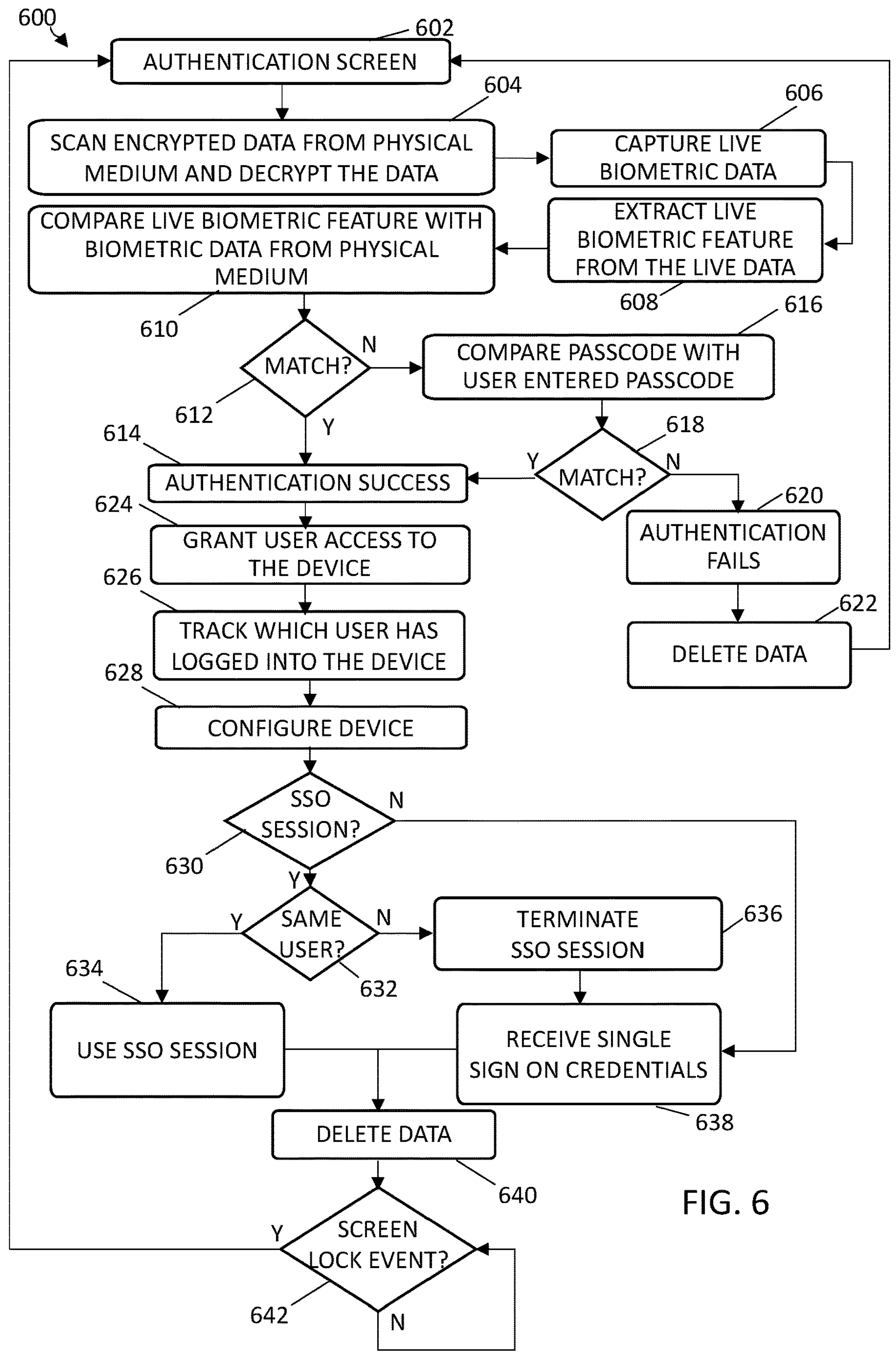
FIG. 6 is a flowchart illustrating another example authentication process in accordance with embodiments of the present disclosure.

FIG. 6 is a flowchart illustrating an example authentication process 600 in accordance with embodiments of the present disclosure. At operation 602, an authentication screen can be rendered on the display of a device (e.g., devices 210-1, 210-2, or 210-3). The authentication screen can be present a locked screen to users that prevents the users from accessing at least one application on the computing device or another device (e.g., such as the server 220) with which the computing device is configured to communicate and/or can prevent users from accessing sensitive data stored on the computing device or the other device. In one example, the authentication screen can enable a user to scan a physical medium (e.g., physical medium 162) that includes encrypted data. As described herein, the encrypted data can include challenge data, such as biometric features, and/or a user-specific passcode to be satisfied before a user can be authenticated and provided access to the computing device (e.g., access to certain applications and/or data), user identification data that can be used to determine an identity of the user, such as a user identifier, an SSO username, device configuration data for personalized configuration of the computing device, and/or other information. At operation 604, the computing device can scan the encrypted data from the physical medium using a data acquisition device and the processor of the computing device can decrypt the encrypted data. As an example, the data acquisition device can be an image capture device (e.g., image capture device 254) or a barcode scan engine (e.g., barcode engine 264), which can be controlled by a processor (e.g., the processor 212) of the computing device automatically and/or in response to input from the user (e.g., such as a receiving a selection of a physical or virtual button). The image capturing device or barcode scan engine can image an encoded data form on the physical medium that encodes the encrypted data. As another example, the data acquisition device can be a radiofrequency reader (e.g., radiofrequency reader 266), which can be controlled by the processor of the computing device to interrogate a radiofrequency tag of the physical medium with a radiofrequency signal automatically and/or in response to input from the user (e.g., such as a receiving a selection of a physical or virtual button). The radiofrequency tag can respond to the interrogation by outputting the encrypted data to the radiofrequency reader. At operation 606, live biometric data of the user can be captured by the computing device (e.g., via a biometric acquisition device, such as image capturing device 254, a palmprint/fingerprint scanner 256, a retina/iris scanner 258, microphone 260, or other biometric acquisition device). In one example, the biometric acquisition device can image a face of the user. At operation 608, the processor of the computing device extracts a live biometric feature from the acquired live biometric data, and at operation 610, the live extracted feature is compared to the biometric feature acquired from the physical medium. In one example, the biometric acquisition device can image a face of the user as the live biometric data and one or more facial features of the user can be extracted from the imaging of the face of the user. Using this approach, the user's live biometric feature(s) are authenticated against biometric features from the physical medium both of which can be acquired by the computing device at the time of authentication. Prior to acquiring the encrypted biometric feature(s) from the physical medium during the authentication process 600, the computing device is unaware of the biometric feature(s) of the user. If there is a match between the biometric feature acquired from the physical medium and the live biometric feature (at operation 612), the processor of the computing device successfully authenticates the user at operation 614. If there is no match (at operation 612), the processor of the computing device can compare a passcode received from the user to the user-specific passcode included in the encrypted data from the physical medium at operation 616. The user entered passcode is authenticated against the user-specific passcode from the physical medium both of which can be acquired by the computing device at the time of authentication. Prior to acquiring the encrypted user-specific passcode from the physical medium during the authentication process 600, the computing device is unaware of the user-specific passcode of the user. If there is a match between the entered passcode and the user-specific passcode (at operation 618), the processor of the computing device successfully authenticates the user at operation 614. If there is no match between the entered passcode and the user-specific passcode (at operation 618), the processor of the computing device fails to authenticate the user at operation 620, deletes the encrypted and decrypted data (e.g., biometric feature(s), passcode, user identifier, SSO username, device configuration data, etc.) acquired from the physical medium, the live biometric data and extracted feature(s) of the user acquired by the biometric acquisition device, and any information entered by the user for authentication at operation 622 (e.g., the user entered passcode), after which, the process 600 can return to operation 602 to render the authentication screen. In some embodiments, the process 600 can be configured to omit operations 616 and 618, such that in response to a failure to match the biometric feature to the live biometric feature at operation 612, the process proceeds to operation 620 at which authentication fails. In some embodiments, the authentication process can exclude biometric authentication such that the user-entered passcode is compared to the user-specific passcode without acquiring and/or comparing biometric data or features of the user. In some embodiments, the order of operations of the authentication process 600 can attempt to authenticate the user first using the user-entered passcode and the user-specific passcode and if that authentication fails, the process can attempt to authenticate the user based on the live biometric feature(s) acquired using the biometric acquisition device and the biometric feature(s) acquired from the physical medium.

When the computing device successfully authenticates the user at operation 614, the processor of the computing device removes the authentication screen at operation 624 to grant the user to access the device (e.g., to at least one application and/or data that the user was prevented from accessing when the authentication screen was rendered on the display). At operation 626, the computing device or another device (e.g., the server 120) in communication with the computing device can track usage of the computing device and associate the usage of the computing device with the user of the computing device based on the user identifier included in the encrypted data acquired from the physical medium. The usage of the computing device and the association of the usage to the user can be stored in a log and/or a data repository (e.g., the database 130 shown in FIG. 1).

At operation 628 the processor of the computing device can configure the device based on device configuration data obtained from the physical medium or from a remote device (e.g., server 120 or 220), if available. In one example, the computing device retrieve a recorded device configuration interface of the user entering the device configuration data can be retrieved by the computing device based on a unique universal resource locator (URL) and tenant identifier obtained from the physical medium. After retrieving the recorded interface, the computing device can use key and touch injection to configure the computing device based on the device configuration data entered in the recorded interface.

At operation 630, the processor of the computing device can determine if there is an active SSO session in the computing device (e.g., maintained in a webview instance). If so, the process 600 proceeds to operation 632, at which the processor of the computing device determines whether the user that has been authenticated is the same user associated with the active SSO session. As an example, the processor of the computing device can compare the SSO username obtained from the physical medium to the SSO username of the existing SSO session in the computing device to determine if the user that has been authenticated is the same user for which an SSO session exists. As another example, if the biometric data previously acquired from the physical medium is held in the webview instance, the biometric data can be compared to the live biometric data to determine that the SSO session corresponds to the authenticated user. If not, the process 600 proceeds to operation 638, at which the processor requests and receives SSO credentials from the user. If there is an existing SSO session (at operation 630) and the computing device determines that user that has been authenticated is the same user as the existing SSO session (at operation 632), the processor of the computing device can allow the user to use the existing SSO session associated with the user at operation 634. If it is not the same user that was authenticated the last time the authentication screen was rendered (operation 632), at operation 636, the processor of the computing device can terminate the previous user's SSO session (if one exists), after which, the process 600 can proceed to operation 638, at which the computing device can receive new single sign-on credentials from the user that has been authenticated and the received single sign-on credentials can be used to by the computing device to establish an SSO session for the user (e.g., via a webview instance providing an SSO log in screen). At operation 640, the processor of the computing device deletes the encrypted and decrypted data (e.g., biometric feature(s), passcode, user identifier, data configuration device, etc.) acquired from the physical medium, the live biometric data and extracted feature(s) of the user acquired by the biometric acquisition device, and/or any information entered by the user for authentication (e.g., the user entered passcode).

At operation 642, the processor of the computing device can determine whether a screen lock event has occurred. If not, the process 600 can repeat operation 642. If it is determined that a screen lock event has occurred, the process 600 can return to operation 602 to rendered the authentication screen on the display of the computing device to lock users out of the computing device.

While FIG. 6 illustrates example operations of the authentication process 600, the authentication process may include more of fewer operations and/or the operations may be performed in different orders or combinations.

Figure 7:
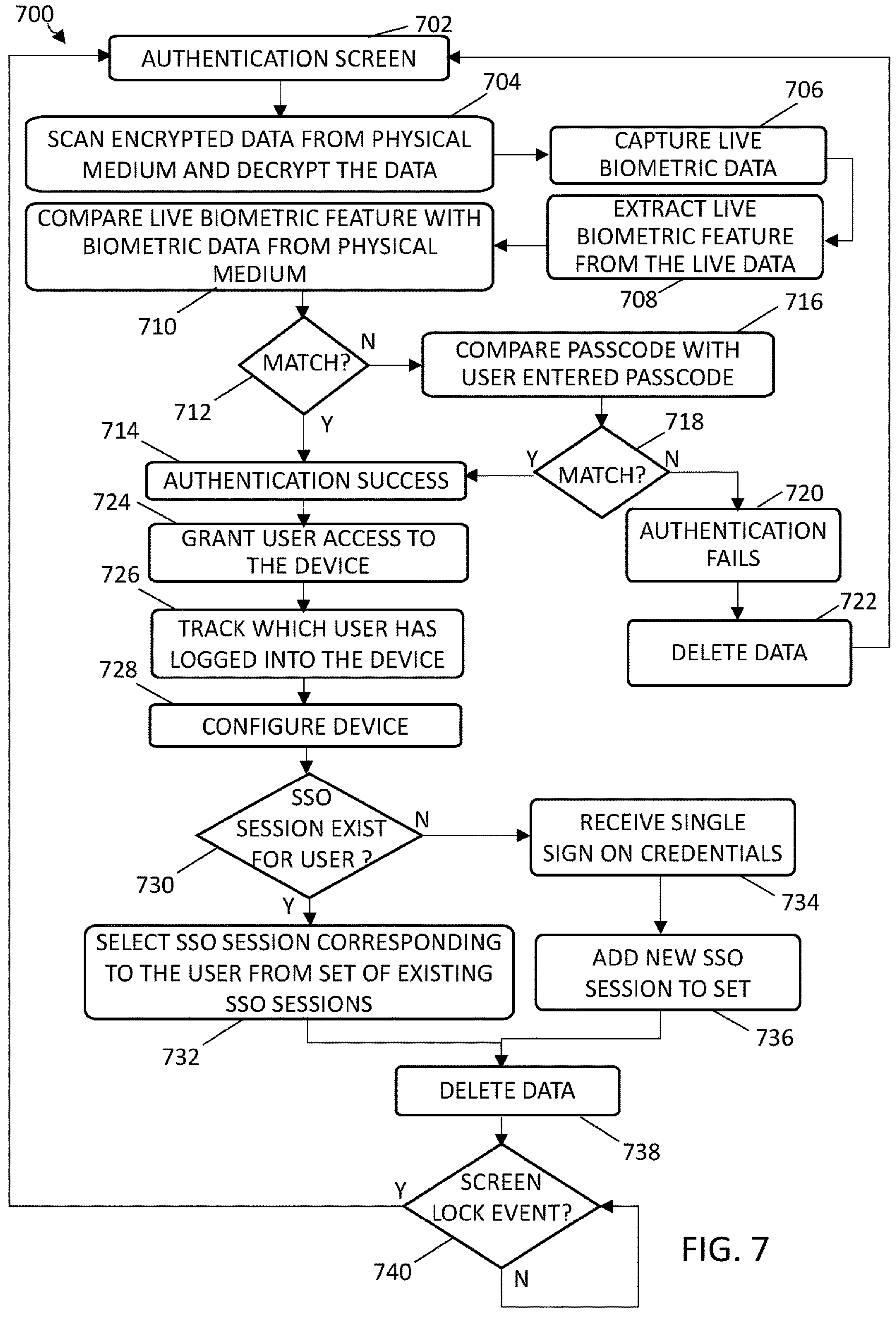
FIG. 7 is a flowchart illustrating another example authentication process in accordance with embodiments of the present disclosure.

FIG. 7 is a flowchart illustrating an example authentication process 700 in accordance with embodiments of the present disclosure. At operation 702, an authentication screen can be rendered on the display of a device (e.g., devices 210-1, 210-2, or 210-3). The authentication screen can be present a locked screen to users that prevents the users from accessing at least one application on the computing device or another device (e.g., such as the server 220) with which the computing device is configured to communicate and/or can prevent users from accessing sensitive data stored on the computing device or the other device. In one example, the authentication screen can enable a user to scan a physical medium (e.g., physical medium 162) that includes encrypted data. As described herein, the encrypted data can include challenge data, such as biometric features, and/or a user-specific passcode to be satisfied before a user can be authenticated and provided access to the computing device (e.g., access to certain applications and/or data), user identification data that can be used to determine an identity of the user, such as a user identifier, an SSO username, device configuration data for personalized configuration of the computing device, and/or other information. At operation 704, the computing device can scan the encrypted data from the physical medium using a data acquisition device and the processor of the computing device can decrypt the encrypted data. As an example, the data acquisition device can be an image capture device (e.g., image capture device 254) or a barcode scan engine (e.g., barcode scan engine 264), which can be controlled by a processor (e.g., the processor 212) of the computing device automatically and/or in response to input from the user (e.g., such as a receiving a selection of a physical or virtual button). The image capturing device or barcode scan engine can image an encoded data form on the physical medium that encodes the encrypted data. As another example, the data acquisition device can be a radiofrequency reader (e.g., radiofrequency reader 266), which can be controlled by the processor of the computing device to interrogate a radiofrequency tag of the physical medium with a radiofrequency signal automatically and/or in response to input from the user (e.g., such as a receiving a selection of a physical or virtual button). The radiofrequency tag can respond to the interrogation by outputting the encrypted data to the radiofrequency reader. At operation 706, live biometric data of the user can be captured by the computing device (e.g., via a biometric acquisition device, such as image capturing device 254, a palmprint/fingerprint scanner 256, a retina/iris scanner 258, microphone 260, or other biometric acquisition device). In one example, the biometric acquisition device can image a face of the user. At operation 708, the processor of the computing device extracts a live biometric feature from the acquired live biometric data, and at operation 710, the live extracted feature is compared to the biometric feature acquired from the physical medium. In one example, the biometric acquisition device can image a face of the user as the live biometric data and one or more facial features of the user can be extracted from the imaging of the face of the user. Using this approach, the user's live biometric feature(s) are authenticated against biometric features from the physical medium both of which can be acquired by the computing device at the time of authentication. Prior to acquiring the encrypted biometric feature(s) from the physical medium during the authentication process 700, the computing device is unaware of the biometric feature(s) of the user. If there is a match between the biometric feature acquired from the physical medium and the live biometric feature (at operation 712), the processor of the computing device successfully authenticates the user at operation 714. If there is no match (at operation 712), the processor of the computing device can compare a passcode received from the user to the user-specific passcode included in the encrypted data from the physical medium at operation 716. The user entered passcode is authenticated against the user-specific passcode from the physical medium both of which can be acquired by the computing device at the time of authentication. Prior to acquiring the encrypted user-specific passcode from the physical medium during the authentication process 700, the computing device is unaware of the user-specific passcode of the user. If there is a match between the entered passcode and the user-specific passcode (at operation 718), the processor of the computing device successfully authenticates the user at operation 714. If there is no match between the entered passcode and the user-specific passcode (at operation 718), the processor of the computing device fails to authenticate the user at operation 720, deletes the encrypted and decrypted data (e.g., biometric feature(s), passcode, user identifier, SSO username, data configuration device, etc.) acquired from the physical medium, the live biometric data and extracted feature(s) of the user acquired by the biometric acquisition device, and any information entered by the user for authentication at operation 722 (e.g., the user entered passcode), after which, the process 700 can return to operation 702 to render the authentication screen. In some embodiments, the process 700 can be configured to omit operations 716 and 718, such that in response to a failure to match the biometric feature to the live biometric feature at operation 712, the process proceeds to operation 720 at which authentication fails. In some embodiments, the authentication process can exclude biometric authentication such that the user-entered passcode is compared to the user-specific passcode without acquiring and/or comparing biometric data or features of the user. In some embodiments, the order of operations of the authentication process 700 can attempt to authenticate the user first using the user-entered passcode and the user-specific passcode and if that authentication fails, the process can attempt to authenticate the user based on the live biometric feature(s) acquired using the biometric acquisition device and the biometric feature(s) acquired from the physical medium.

When the computing device successfully authenticates the user at operation 714, the processor of the computing device removes the authentication screen at operation 724 to grant the user to access the device (e.g., to at least one application and/or data that the user was prevented from accessing when the authentication screen was rendered on the display). At operation 726, the computing device or another device (e.g., the server 120) in communication with the computing device can track usage of the computing device and associate the usage of the computing device with the user of the computing device based on the user identifier included in the encrypted data acquired from the physical medium. The usage of the computing device and the association of the usage to the user can be stored in a log and/or a data repository (e.g., the database 130 shown in FIG. 1).

At operation 728, the processor of the computing device can configure the device based on device configuration data obtained from the physical medium or from a remote device (e.g., server 120 or 220), if available. In one example, the computing device retrieve a recorded device configuration interface of the user entering the device configuration data can be retrieved by the computing device based on a unique universal resource locator (URL) and tenant identifier obtained from the physical medium. After retrieving the recorded interface, the computing device can use key and touch injection to configure the computing device based on the device configuration data entered in the recorded interface.

At operation 730, the processor of the computing device can determine the user has an existing SSO session in the computing device. As an example, the processor of the computing device can compare the SSO username obtained from the physical medium to the SSO usernames of the existing SSO sessions in the computing device to determine if the user has an existing SSO session. If the user has an existing SSO session, the process 700 proceeds to operation 732, at which the processor of the computing device selects the SSO session associated with the user from a set of existing SSO sessions for users of the computing device and allows the user to user the SSO session corresponding to the user. The SSO sessions in the set can be maintained as active for the users, e.g., by periodically refreshing their access tokens. If there is no existing SSO session for user (e.g., because the user has not established an SSO session with the computing device before or for other reasons), the process 700 proceeds to operation 734, at which the processor requests and receives SSO credentials from the user and the computing device establishes an SSO session for the user. At operation 736, the processor of the computing device adds the new SSO session from the user to the set of existing SSO sessions for users of the computing device. At operation 738, the processor of the computing device deletes the encrypted and decrypted data (e.g., biometric feature(s), passcode, user identifier, data configuration device, etc.) acquired from the physical medium, the live biometric data and extracted feature(s) of the user acquired by the biometric acquisition device, and/or any information entered by the user for authentication (e.g., the user entered passcode).

At operation 740, the processor of the computing device can determine whether a screen lock event has occurred. If not, the process 700 can repeat operation 740. If it is determined that a screen lock event has occurred, the process 700 can return to operation 702 to rendered the authentication screen on the display of the computing device to lock users out of the computing device.

While FIG. 7 illustrates example operations of the authentication process 700, the authentication process may include more or fewer operations and/or the operations may be performed in different orders or combinations.

Figure 8:
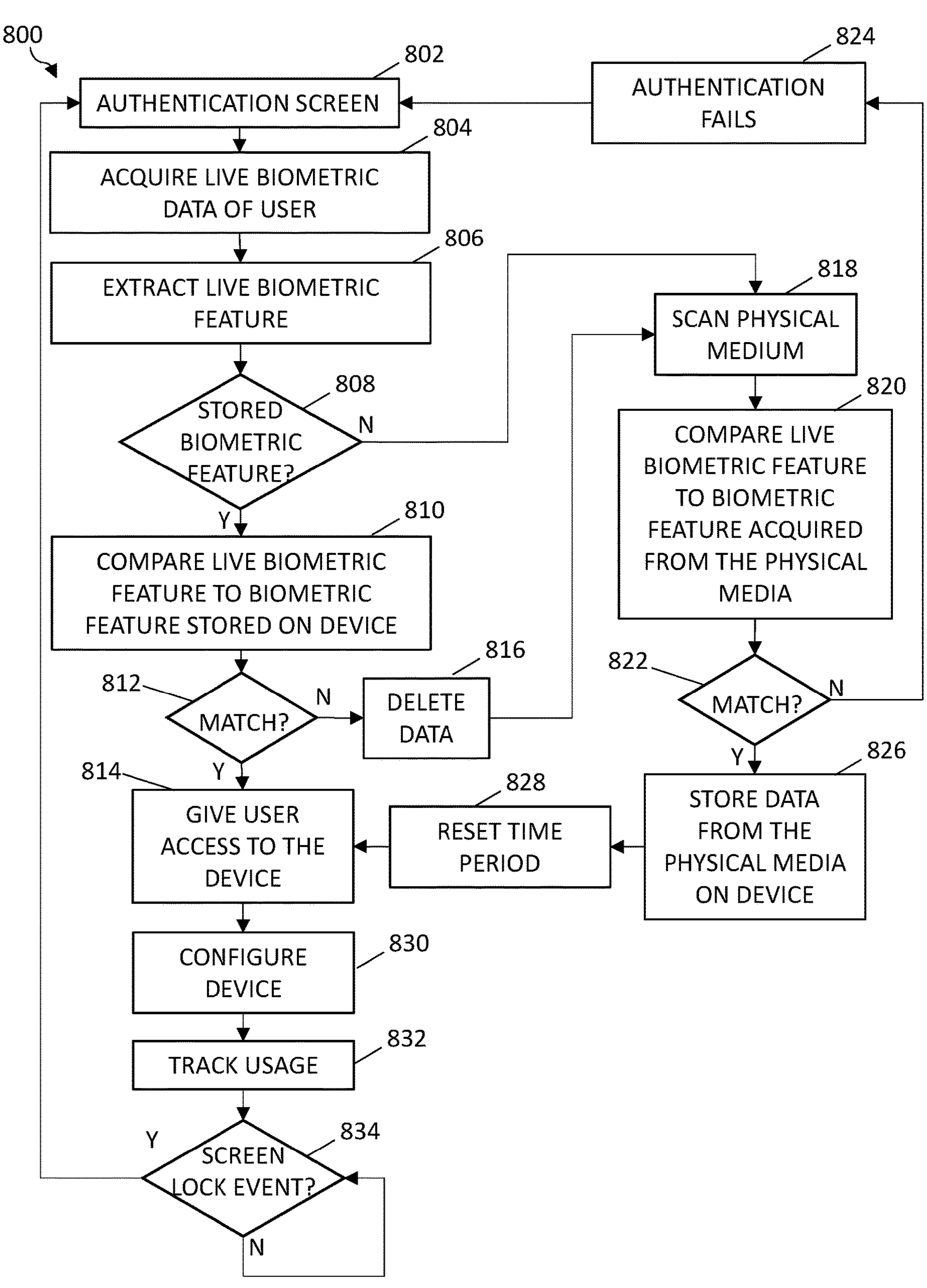
FIG. 8 is a flowchart illustrating another example authentication process in accordance with embodiments of the present disclosure.
Figure 9:
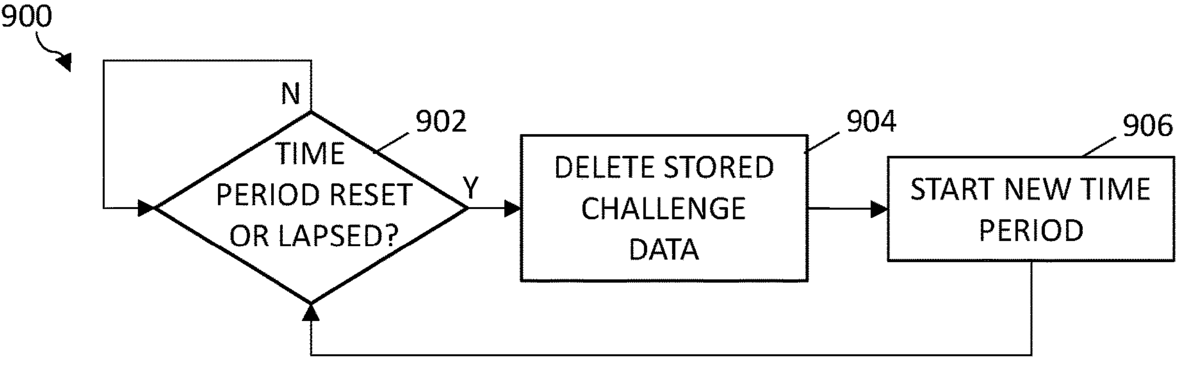
FIG. 9 is a flowchart illustrating an example process for managing user credentials and data on a computing device in accordance with embodiments of the present disclosure.

FIG. 8 is a flowchart illustrating an example authentication process 800 in accordance with embodiments of the present disclosure. FIG. 9 is a flowchart illustrating an example process 900 that can be implemented in parallel with the authentication process 800 of FIG. 8. With reference to FIG. 9, the device can be configured to implement a timer or configurable time period during which challenge data (biometric data and user-specific passcode obtained from a physical medium) for a user can be stored in memory. After a timer expires or is reset or after a configurable time period lapses or is reset, the device can delete the stored challenge data. As a non-limiting example, the timer or configurable time period can correspond to shifts of a work schedule in a facility within which the device is deployed (e.g., 8-hour shifts throughout a day). At operation 902, the device determines if the time configurable time period has lapsed or has been reset. If not, the process repeats operation 902. If so, the device deletes the challenge data from the device at operation 904 and starts a new time period at operation 906, after which the process 900 returns to operation 902.

Reference now to FIG. 8, at operation 802, an authentication screen can be rendered on the display of a computing device (e.g., computing device 210-1, 210-2, or 210-3). The authentication screen can be present a locked screen to users that prevents the users from accessing at least one application on the computing device or another device (e.g., such as the server 220) with which the computing device is configured to communicate and/or can prevent users from accessing sensitive data stored on the computing device or on another device (e.g., such as the server 220). In one example, the operating system or firmware of the computing device can include locked screen functionality that is configured to implement the authentication screen. In one example, the locked screen functionality of the operating system of the computing device can be disabled and the authentication screen can be an application installed on the computing device, e.g., during a provisioning process in an enterprise system. In one example, the authentication screen can enable a user to scan physical medium (e.g., physical medium 162) that includes encrypted data. As described herein, the encrypted data can include challenge data, such as biometric features and/or a user-specific passcode to be satisfied before a user can be authenticated and provided access to the computing device (e.g., access to certain applications and/or data), user identification data that can be used to determine an identity of the user, such as a user identifier, SSO credentials for establishing an SSO session, device configuration data for personalized configuration of the computing device, and/or other information. At operation 804, live biometric data of the user can be acquired by the computing device (e.g., via a biometric acquisition device, such as image capturing device 254, a fingerprint reader 256, a retina scanner 258, microphone 260, or other biometric acquisition device). In one example, the biometric acquisition device can be an image capturing device that images a face of the user. At operation 806, the processor of the computing device extracts a live biometric feature from the acquired live biometric data. In one example, the biometric acquisition device can image a face of the user as the live biometric data and one or more facial features of the user can be extracted from the imaging of the face of the user. At operation 808, the processor of the computing device determines whether challenge data, one or more biometric features, was previously stored by the computing device. As an example, the processor of the computing device can be programmed to store the biometric feature(s) obtained from a physical medium for the last user that was authenticated by the computing device. The stored biometric feature(s) of the last user that was authenticated can be stored for a configurable time period according to FIG. 9, such that when the time period lapses or is reset, the stored biometric feature(s) would be deleted from the computing device. If the computing device has a stored biometric feature, at operation 810, the processor of the computing device compares the stored biometric feature to the acquired live biometric feature. If the processor of the computing device determines that the stored biometric feature matches the acquired live biometric feature (at operation 812), the user is successfully authenticated and granted access to the computing device at operation 814.

If there is no match (at operation 812), at operation 816, the processor of the computing device can delete the previously stored biometric feature(s), and at operation 818, can scan a physical medium associated with the user to acquire biometric data including a biometric feature from the physical medium. Similarly, if the processor of the computing device determines there no stored biometric features on the computing device (at operation 808), the process 800 can proceed to operation 818. As an example, the computing device can scan/read the encrypted data from the physical medium and decrypt the encrypted data. As an example, the data acquisition device can be an image capture device (e.g., image capture device 254) or a barcode scan engine (e.g., barcode scan engine 264), which can be controlled by a processor (e.g., the processor 212) of the computing device automatically and/or in response to input from the user (e.g., such as a receiving a selection of a physical or virtual button). The image capture device or the barcode scan engine can image an encoded data form on the physical medium that encodes the encrypted data. As another example, the data acquisition device can be a radiofrequency reader (e.g., RF reader 266), which can be controlled by the processor of the device to interrogate a radiofrequency tag of the physical medium with a radiofrequency signal automatically and/or in response to input from the user (e.g., such as a receiving a selection of a physical or virtual button). The radiofrequency tag can respond to the interrogation by outputting the encrypted data to the radiofrequency reader. At operation 820, the live biometric feature is compared to the biometric feature acquired from the physical medium. If there is no match (at operation 822), the process 800 proceeds to operation 824 at which authentication fails. Upon failing to authenticate the user (at operation 822), the process 800 can return to operation 802. If there is a match between the biometric feature acquired from the physical medium and the live biometric feature (at operation 822), the processor of the computing device successfully authenticates the user and stores the biometric feature obtained from the physical medium on the on the computing device at operation 826. In some embodiments, if there is no match (at operation 822), the computing device can compare a passcode received from the user to the user-specific passcode included in the data obtained from the physical medium as described herein before authentication fails (e.g., as described in FIGS. 6 and 7). At operation 828, the processor of the computing device can reset the time period if one exists, which can trigger the process of FIG. 9 to delete the stored biometric feature(s) and start a new time period. At operation 814, the user can be granted access to the computing device. Once the user is granted access to the computing device, in some embodiments, the process 800 can provide for establishing a SSO session for the user in a manner described herein (e.g., as described in FIGS. 6 and/or 7).

At operation 830, the processor of the computing device can configure the device based on device configuration data obtained from the physical medium or from a remote device (e.g., server 120 or 220), if available. In one example, the computing device retrieve a recorded device configuration interface of the user entering the device configuration data can be retrieved by the computing device based on a unique universal resource locator (URL) and tenant identifier obtained from the physical medium. After retrieving the recorded interface, the computing device can use key and touch injection to configure the computing device based on the device configuration data entered in the recorded interface.

At operation 832, the computing device or another device (e.g., the server 120) in communication with the computing device can track usage of the device and associate the usage of the computing device with the user of the computing device based on the user identifier included in the encrypted data acquired from the physical medium. The usage of the computing device and the association of the usage to the user can be stored in a log and/or a data repository (e.g., the database 130 shown in FIG. 2).

At operation 834, the processor of the computing device can determine whether a screen lock event has occurred. If not, the process 800 can repeat operation 832. If it is determined that a screen lock event has occurred, the process 800 can return to operation 802 to render the authentication screen on the display of the computing device to lock users out of the computing device.

In some embodiments, the process 800 can be devoid of operation 828 such that the current time period continues until it lapses before the stored biometric feature(s) is deleted from the computing device via the process 900 of FIG. 9. As an example, a first user may have previously been authenticated by the device and the first user's biometric feature(s) may be stored by the device during a first time period (e.g., an 8-hour time period). Some time later (e.g., 4 hours later) during the first time period, the first user may cease using the computing device triggering a screen lock event (e.g., because the device has been idle for a specified amount of time). While some time remains during the first time period (e.g., 4 hours remaining), a second user may be authenticated by the computing device. The process 800 can store the second user's biometric feature for the remainder of the first configurable time period and when the first configurable time period lapses (e.g., after 4 hours), the second user's stored biometric feature(s) can be deleted from the computing device such that the next time the authentications screen is rendered after the first time period lapsed, the second user would be required to scan the physical medium to be authenticated because the computing device is no longer storing the user's biometric feature(s).

While FIG. 8 illustrates example operations of the authentication process 800 and FIG. 9 illustrates example timing process operating in parallel with FIG. 8, the authentication process and/or timing process may include more of fewer operations and/or the operations may be performed in different orders or combinations.

The above description refers to diagrams of the accompanying drawings. Alternative implementations of the example represented by the diagrams include one or more additional or alternative elements, processes and/or devices. Additionally, or alternatively, one or more of the example elements of the diagram may be combined, divided, re-arranged or omitted.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method comprising:

rendering an authentication screen on a display of a computing device, the authentication screen preventing access to at least one application via the computing device;

scanning, by the computing device, a physical medium that is external to, and independent of, the computing device to acquire challenge data for a user from the physical medium;

acquiring, by the computing device, response data from the user;

determining whether the response data matches the challenge data;

in response to a successful match, removing the authentication screen from the display, and granting access to the at least one application;

receiving single sign-on credentials from the user in response to the successful match;

establishing a single sign-on session for the user with the single sign-on credentials;

rendering the authentication screen in response a lock screen event;

maintaining the single sign-on session for the user;

in response to a next user being authenticated based on challenge data and response data associated with the next user, determining whether the next user corresponds to the user that was last authenticated for the computing device or to a different user;

in response to the next user corresponding to the user that was last authenticated, allowing the next user to use the single sign-on session; and in response to the next user corresponding to the different user, terminating the single sign-on session and requesting new single sign-on credentials for the next user to establish a new single sign-on session.

2. The method of claim 1, further comprising:

deleting the challenge data and the response data from the computing device after determining whether the response data matches the challenge data;

rendering the authentication screen again after a lock screen event occurs;

re-scanning, by the computing device, the physical medium to re-acquire challenge data for the user from the physical medium;

re-acquiring, by the computing device, response data from the user;

determining whether the re-acquired response data matches the re-acquired challenge data; and in response to another successful match, removing the authentication screen from the display, and granting access to the at least one application.

3. The method of claim 1, further comprising:

encrypting the challenge data;

storing the encrypted challenge data in the computing device during a time period; and deleting the challenge data when the time period lapses or is reset.

4. The method of claim 3, further comprising:

rendering the authentication screen again after a lock screen event occurs;

determining whether the encrypted challenge data is stored in the computing device;

bypassing an operation of scanning the physical medium in response to determining the encrypted challenge data is stored;

re-acquiring, by the computing device, response data from the user;

determining whether the re-acquired response data matches the challenge data; and in response to another successful match, removing the authentication screen from the display, and granting access to the at least one application.

5. The method of claim 1, wherein the challenge data correspond to previously acquired biometric data for the user and a previously established passcode encoded on the physical medium and the response data correspond to live biometric data of the user and a user-entered passcode received by the computing device via a user interface, and determining whether the response data matches the challenge data comprises:

determining whether at least one of (i) the live biometric data matches the previously acquired biometric data for the user encoded on the physical medium or (ii) the user-entered passcode matches the previously established passcode encoded on the physical medium.

6. The method of claim 1, wherein a user identifier is acquired from the physical medium in response to scanning the physical medium, and in response to the successful match, the method further comprises:

identifying the user that has been authenticated via the authentication screen based on the user identifier; and associating operations performed by the computing device with the user identifier.

7. The method of claim 1, wherein next user is the user, a single sign-on username is acquired from the physical medium for the user in response to scanning the physical medium, and determining the next user corresponds to the user comprises comparing the single sign-on username acquired from the physical medium against a single sign-on username associated with the single sign-on session.

8. The method of claim 1, further comprising:

maintaining a set of sign-on sessions for a plurality of users of the computing device, the plurality of users including the user;

in response to a next user being authenticated based on challenge data and response data associated with the next user, determining an identity of the next user;

determining whether the computing device is maintaining an active single sign-on session for the next user based on the identity of the next user;

in response to determining the active single sign-on session exist for the next user, selecting the active single sign-on session corresponding to the identity of the next user and allowing the next user to use the active single sign-on session; and in response to determining the active single sign-on session does not exist for the next user, requesting new single sign-on credentials for the next user to establish a new single sign-on session.

9. The method of claim 8, wherein the challenge data and a single sign-on username for the next user is acquired from a physical medium associated with the next user, the response data for the next user is acquired from the user, the identity of the user is determined based on the single sign-on username, and determining whether the computing device is maintaining an active single sign-on session for the next user comprises comparing the single sign-on username acquired from the physical medium against a plurality of single sign-on usernames associated with the single sign-on sessions in the set.

10. The method of claim 1, further comprising:
encrypting the single sign-on credentials;
storing the encrypted single sign-on credentials;
retrieving and decrypting the encrypting single sign-on credentials in response to a requirement to establish a new single sign-on session for the user; and
using the single sign-on credentials to establish the new single sign-on session for the user.

11. The method of claim 1, wherein scanning the physical medium comprises at least one of:
imaging at least one encoded data form disposed on a substrate of the physical medium via an image capturing device or a barcode scan engine of the computing device; or
interrogating at least one radiofrequency tag supported by a substrate of the physical medium.

12. The method of claim 1, further comprising:
establishing the challenge data for the user during an enrollment process;
encrypting the challenge data; and
transferring the encrypted challenge data to the physical medium by at least one of printing one or more encoded data forms on the physical medium that include the challenge data or encoding one or more radiofrequency tags of the physical medium with the challenge data.

13. The method of claim 1, further comprising:
configuring the computing device based on device configuration data acquired from the physical medium or from a server based on a universal resource locator acquired from the physical medium.

14. A computing device, comprising:
a display;
a plurality of data acquisition devices;
a non-transitory computer-readable medium configured to store instructions;
a processor operatively coupled to the display and the plurality of acquisition devices, the processor configured execute the instructions to:
render an authentication screen on the display, the authentication screen preventing access to at least one application via the processor;
scan, via a first data acquisition device of the plurality of data acquisition devices, a physical medium that is external to, and independent of, the computing device to acquire challenge data for a user from the physical medium;
acquire response data from the user via the first data acquisition device or a second data acquisition device of the plurality of data acquisition devices;
determine whether the response data matches the challenge data;
in response to a successful match, remove the authentication screen from the display, and grant access to the at least one application;
receive single sign-on credentials from the user in response to the successful match;
establish a single sign-on session for the user with the single sign-on credentials;
render the authentication screen in response a lock screen event;
maintain the single sign-on session for the user;
in response to a next user being authenticated based on challenge data and response data associated with the next user, determine whether the next user corresponds to the user that was last authenticated for the computing device or to a different user;
in response to the next user corresponding to the user that was last authenticated, allow the next user to use the single sign-on session; and
in response to the next user corresponding to the different user, terminate the single sign-on session and request new single sign-on credentials for the next user to establish a new single sign-on session.

15. The computing device of claim 14, wherein the next user is the user, a single sign-on username is acquired from the physical medium for the user in response to scanning the physical medium, and determining the next user corresponds to the user comprises comparing the single sign-on username acquired from the physical medium against a single sign-on username associated with the single sign-on session.

16. The computing device of claim 14, wherein the processor is configured to:
maintain a set of sign-on sessions for a plurality of users of the computing device, the plurality of users including the user;
in response to a next user being authenticated based on challenge data and response data associated with the next user, determine an identity of the next user;
determine whether the computing device is maintaining an active single sign-on session for the next user based on the identity of the next user;
in response to determining the active single sign-on session exist for the next user, select the active single sign-on session corresponding to the identity of the next user and allow the next user to use the selected active single sign-on session; and
in response to determining the active single sign-on session does not exist for the next user, request new single sign-on credentials for the next user to establish a new single sign-on session.

17. The computing device of claim 16, wherein the challenge data and a single sign-on username for the next user is acquired from a physical medium associated with the next user, the response data for the next user is acquired from the user, the identity of the user is determined based on the single sign-on username, and wherein the processor is configured to determine whether an active single sign-on session is being maintained for the next user by comparing the single sign-on username acquired from the physical medium against a plurality of single sign-on usernames associated with the single sign-on sessions in the set.

18. A non-transitory computer-readable medium comprising instructions, wherein execution of the instructions by a processing device causes the processing device to:
render an authentication screen on the display, the authentication screen preventing access to at least one application via the processor;
scan, via a first data acquisition device of the plurality of data acquisition devices, a physical medium that is external to, and independent of, the computing device to acquire challenge data for a user from the physical medium;
acquire response data from the user via the first data acquisition device or a second data acquisition device of the plurality of data acquisition devices;
determine whether the response data matches the challenge data;
in response to a successful match, remove the authentication screen from the display, and grant access to the at least one application;
receive single sign-on credentials from the user in response to the successful match;

establish a single sign-on session for the user with the single sign-on credentials;

render the authentication screen in response a lock screen event;

maintain the single sign-on session for the user;

in response to a next user being authenticated based on challenge data and response data associated with the next user, determine whether the next user corresponds to the user that was last authenticated for the computing device or to a different user;

in response to the next user corresponding to the user that was last authenticated, allow the next user to use the single sign-on session; and in response to the next user corresponding to the different user, terminate the single sign-on session and request new single sign-on credentials for the next user to establish a new single sign-on session.

* * * * *